United States Patent
McGuire

(10) Patent No.: US 10,657,553 B2
(45) Date of Patent: May 19, 2020

(54) SYSTEM AND METHOD FOR DYNAMICALLY PROVIDING TASK-BASED DISCOUNTS BASED ON GEOLOCATION AND USER ACTIVITY

(71) Applicant: SkinnyPrice, Inc., San Francisco, CA (US)

(72) Inventor: Daniel Owen McGuire, Campbell, CA (US)

(73) Assignee: SKINNY PRICE, INC., Sacramento, CA (US)

( * ) Notice: Subject to any disclaimer, the term of this patent is extended or adjusted under 35 U.S.C. 154(b) by 726 days.

(21) Appl. No.: 15/266,610

(22) Filed: Sep. 15, 2016

(65) Prior Publication Data
US 2017/0132650 A1    May 11, 2017

Related U.S. Application Data

(63) Continuation of application No. PCT/US2015/021292, filed on Mar. 18, 2015.
(Continued)

(51) Int. Cl.
G06Q 30/06      (2012.01)
G06Q 30/02      (2012.01)

(52) U.S. Cl.
CPC ......... *G06Q 30/0224* (2013.01); *G06Q 30/02* (2013.01); *G06Q 30/0207* (2013.01);
(Continued)

(58) Field of Classification Search
CPC ............................... G06Q 10/00; G06Q 40/00
(Continued)

(56) References Cited

U.S. PATENT DOCUMENTS 5,053,957 A     10/1991   Suzuki
5,710,887 A  *  1/1998    Chelliah ................ G06Q 20/12
                                                    705/26.62
(Continued)

OTHER PUBLICATIONS

International Search Report and Written Opinion in PCT/US15/21292, dated Jul. 29, 2015.
(Continued)

*Primary Examiner* — Romain Jeanty
(74) *Attorney, Agent, or Firm* — Cooley LLP; Max Colice

(57) ABSTRACT

In some implementations, a system can dynamically generate discounts for website customers browsing merchant inventories, based on completion of product discount tasks. The system can determine a product discount task compatible with the website customer's device's operating system (OS) and can provide the website customer with a browser cookie configured to track the website customer's browsing activity. Once the website customer has completed the product discount task, the system can analyze data relating to the completion of the product discount task, data collected by the browser cookie, the geolocation of the website customer, and/or other information. The system can also perform a number of checks to ensure that the website customer is human. The system can then calculate a discount for the website customer, and can allow the website customer to perform a number of other product discount tasks for a chance to obtain a larger discount.

22 Claims, 22 Drawing Sheets

Related U.S. Application Data

(60) Provisional application No. 61/954,939, filed on Mar. 18, 2014.

(52) U.S. Cl.
CPC ..... *G06Q 30/0222* (2013.01); *G06Q 30/0239* (2013.01); *G06Q 30/06* (2013.01)

(58) Field of Classification Search
USPC .............................................. 705/7.11–7.14
See application file for complete search history.

(56) References Cited

U.S. PATENT DOCUMENTS

| | | |
|---|---|---|
| 6,978,253 B2 | 12/2005 | Lin |
| 7,024,376 B1 | 4/2006 | Yuen |
| 7,487,112 B2 | 2/2009 | Barnes, Jr. |
| 7,577,589 B2 | 8/2009 | Sandholm et al. |
| 7,647,252 B2 | 1/2010 | Rampell et al. |
| 7,698,171 B2 | 4/2010 | Rampell et al. |
| 7,788,139 B2 | 8/2010 | Rampell et al. |
| 7,848,960 B2 | 12/2010 | Rampell et al. |
| 7,970,649 B2 | 6/2011 | Wu |
| 7,970,690 B2 | 6/2011 | Diana et al. |
| 7,996,298 B1 | 8/2011 | Catane |
| 8,185,434 B2 | 5/2012 | Bous |
| 8,214,238 B1 * | 7/2012 | Fairfield ............. G06Q 10/063 705/7.11 |
| 8,280,779 B2 | 10/2012 | Davis et al. |
| 8,301,125 B2 | 10/2012 | Ramer et al. |
| 8,301,543 B2 | 10/2012 | Seaman |
| 8,311,845 B2 | 11/2012 | Vengroff et al. |
| 8,364,540 B2 | 1/2013 | Soroca et al. |
| 8,489,112 B2 * | 7/2013 | Roeding ................ G06Q 30/00 455/456.1 |
| 8,611,919 B2 | 12/2013 | Barnes, Jr. |
| 8,655,703 B2 | 2/2014 | McGuire |
| 8,694,348 B2 * | 4/2014 | McGuire ............ G06Q 30/0239 705/7.11 |
| 9,836,753 B2 * | 12/2017 | Wu ........................ G06Q 30/02 |
| 2002/0052788 A1 | 5/2002 | Perkes et al. |
| 2002/0165771 A1 | 11/2002 | Walker et al. |
| 2007/0239560 A1 | 10/2007 | McGuire et al. |
| 2009/0018909 A1 | 1/2009 | Grecia |
| 2011/0251879 A1 | 10/2011 | Lambert et al. |
| 2013/0144785 A1 | 6/2013 | Karpenko et al. |
| 2014/0156378 A1 | 6/2014 | McGuire |

OTHER PUBLICATIONS

M. Rappa, "Business Models on the Web," www.digitalenterprise.org (Jan. 17, 2010) (downloaded Feb. 23, 2012).

www.beezag.com (downloaded Feb. 24, 2012) http://www.beezag.com, 21 pages.

www.dubli.com (downloaded Feb. 24, 2012) http://us.dubli.com, 65 pages.

* cited by examiner

Client Device Technology Stack 202

- HTML 204
  - Javascript (and/or a similar client-side web application coding platform) 206
  - Bootstrap, Foundation (and/or a similar client-side web application framework) 208
  - SASS/CSS (and/or a similar HTML style technology) 210

Web Server Technology Stack 210

- NGINX, Apache, Lighttpd, Puma (and/or a similar high-performance per-core HTTP server system) 212
- Express.js, Koa, Hapi (and/or a similar server-side web application framework) 214
- Memcached (and/or a similar server-side technology for storing and/or rapidly querying session-based data) 216
- Node.js, Ruby, Python, PHP (and/or a similar high-concurrency server-side functional programming language) 218
- AWS Load Balancing, Heroku, Backspace 220
- AWS EC2 Linux Web Servers (and/or a similar high-performance server system) 222

Database Technology Stack 224

- AWS DynamoDB (and/or a similar high-performance, low-latency, input-only data recording technology for logging user activity and/or other data) 226
- MongoDB (and/or a similar high-performance, low-latency, IO data recording technology for querying user profile data and/or other discount management data) 228
- Postgres, MySQL (and/or a similar relational database platform) 230

SYSTEM AND METHOD FOR DYNAMICALLY PROVIDING TASK-BASED DISCOUNTS BASED ON GEOLOCATION AND USER ACTIVITY

CROSS-REFERENCE TO RELATED APPLICATIONS

This application is a bypass continuation of International Application No. PCT/US2015/021292, filed on Mar. 18, 2015, which in turn claims the priority benefit of U.S. Application No. 61/954,939, filed on Mar. 18, 2014. Each of these applications is incorporated herein by reference in its entirety.

BACKGROUND

Consumers frequently use mobile devices to assist them while they are shopping. For example, customers can go to a physical retail store to look at products they would like to buy, and then use a number of mobile applications to scan the barcode, take a picture of the product, and/or to enter the product name. Consumers can also receive discounts for products, e.g., via mail, email, and/or via mobile applications. However, typical product discounts cannot take into account data relating to the consumers. Additionally, typical discount systems are unable to verify the identity and/or nature of consumers, allowing consumers to create scripts and/or other methods to obtain multiple discounts. This can result in lost revenue and/or inefficient methods of determining whether a potential consumer is a human consumer and/or a computer program.

SUMMARY

Systems and methods herein generally relate to dynamically calculating discounts for website customer browsing merchant websites, e.g., based on completion of product discount tasks, a geolocation of the website customer, the browsing histories of the website customers, and/or other website customer-related data. In some implementations, for example, a website customer browsing a merchant website can select a product and elect to obtain a discount on the product. The systems and methods herein can determine a product discount task compatible with the website customer's device's operating system (OS) and can provide the website customer with a browser cookie configured to track the website customer's activity on the merchant website (and/or on a variety of other websites). Once the website customer has completed the product discount task, the systems and methods herein can analyze data relating to the completion of the product discount task, data collected by the browser cookie, data relating to the geolocation of the website customer as she is browsing the merchant website and/or requesting a product discount, and/or the like.

Depending on the results of the analysis, the systems and methods herein can determine whether the website customer is a computer or a human, and can calculate a product discount for the website customer if the website customer is human. A calculation for the product discount can be determined, e.g., based on the geolocation of the website customer, based on the website customer's browsing history, based on data relating to the product for which the website customer requested a discount, and/or based on numerous factors. The website customer can then determine whether or not to perform one or more additional product discount tasks, e.g., to increase the chances of obtaining additional and/or larger discounts. Once the website customer accepts a product discount, the product discount can be applied to the price of the selected product, and the website customer can continue to request product discounts for a number of other products on the merchant website.

Systems and methods herein can facilitate a process of automatically determining and providing a discounted price for a product displayed on a merchant website for a website customer browsing the merchant website using a network-enabled device in response to automatic verification that the website customer has successfully completed a device-specific task. The process can include a discount management server obtaining, via a user interface provided on the merchant website and the internet-enabled device, a request from the website customer to obtain a discount on the product displayed on the merchant website. The discount management server can retrieve an indication of browsing activity of the website customer on the internet-enabled device. The discount management server can determine an operating system (OS) of the internet-enabled device based at least in part on the request information.

The discount management server can estimate a geographic location of the website customer based on at least one of a Global Positioning System (GPS) signal from the internet-enabled device, an Internet Protocol (IP) address of the internet-enabled device, an iBeacon and/or similar Bluetooth-enabled beaconed device which can locate the website customer based on whether or not the website customer's device is connected to the iBeacon and/or similar device, and/or by determining, based on data in a scanned NFC product tag, where the product is located, and therefore where the website customer is located. The discount management server can automatically determine, based at least in part on the product displayed on the merchant website, the indication of browsing activity of the website customer, and the geographic location estimated of the website customer, a product discount function representative of a number of product discounts on the product displayed on the merchant website.

The discount management server can retrieve, from a memory, a product discount task for the website customer based at least in part on the OS of the internet-enabled device. The discount management server can send the product discount task to the internet-enabled device for display to the website customer. The discount management server can obtain, via the internet-enabled device, an indication of whether or not the website customer successfully completed the product discount task. If the indication indicates that the website customer has successfully completed the product discount task, the discount management server can automatically select the discounted price based on the determined product discount function.

The process can further include the discount management server automatically retrieving, from a database via an application programming interface, product information associated with the product displayed on the merchant website and/or information associated with the website customer. The discount management server can also automatically determine, based at least in part on the information associated with the website customer, the product discount function. The process can further include the discount management server pinging the IP address of the internet-enabled device.

In some implementations, the discount management server can determine the product discount function based at least in part on at least one of input from the website merchant and the retrieved product discount task. The discount management server can also retrieve, from the memory, the product discount task for the website customer based at least in part on the product displayed on the merchant website, the indication of browsing activity of the website customer, and the geographic location estimated of the website customer. The discount management server can, for a first type of the OS of the internet-enabled device, provide a close-captioned verification code with the product discount task, and, for a second type of the OS of the internet-enabled device, provide another type of verification code with the product discount task.

In some implementations, the product discount task comprises watching an advertisement for a period greater than an advertisement impression period. The discount management server can determine if the website customer watched the advertisement for a period greater than the advertisement impression period. The discount management server can also determine the product discount function based at least in part on whether or not the website customer watched the advertisement for a period greater than the advertisement impression period. The discount management server can also record an indication of whether or not the website customer purchased the product at the discounted price, and can automatically adjust the product discount function in response to the indication of whether or not the website customer purchased the product at the discounted price. The discount management server can also automatically select the discounted price based at least in part on whether another website customer has successfully completed another product discount task.

Systems and methods disclosed herein can also facilitate computer system for automatically determining and providing a discounted price for a product displayed on a merchant website for a website customer browsing the merchant website using a network-enabled device in response to automatic verification that the website customer has successfully completed a device-specific task. The computer system can include a network interface operably coupleable to the internet, a memory to store a plurality of product discount tasks and a plurality of product discount functions, each product discount function in the plurality of product discount functions representative of a respective plurality of product discounts on the product displayed on the merchant website, and a processor, operably coupled to the network interface and to the memory, to perform a number of actions.

Such actions can include obtaining, via the network interface, a request from the website customer to obtain a discount on the product displayed on the merchant website, retrieving, via the network interface, an indication of browsing activity of the website customer on the internet-enabled device. The actions can also include determining an operating system (OS) of the internet-enabled device based at least in part on the request from the website customer, and estimating a geographic location of the website customer based on at least one of a Global Positioning System (GPS) signal from the internet-enabled device and an Internet Protocol (IP) address of the internet-enabled device. The actions can also include automatically selecting, based at least in part on the product displayed on the merchant website, the indication of browsing activity of the website customer, and the geographic location of the website customer, one of the plurality of product discount functions stored in the memory, retrieving, from the memory, a product discount task for the website customer based at least in part on the OS of the internet-enabled device, and sending, via the network interface, the product discount task to the internet-enabled device for display to the website customer. The actions can also include obtaining, via the network interface, an indication of whether or not the website customer successfully completed the product discount task, and, if the indication indicates that the website customer has successfully completed the product discount task, automatically selecting the discounted price based on the one of the plurality of product discount functions.

In some implementations, the processor can also automatically retrieve, via an application programming interface, product information associated with the product displayed on the merchant website. The processor can also automatically retrieve, from a database via an application programming interface, information associated with the website customer, and automatically select, based at least in part on the information associated with the website customer, the one of the plurality of product discount functions. The processor can also estimate the geographic location of the website customer at least in part by pinging the IP address of the internet-enabled device.

In some implementations, the processor can automatically select the one of the plurality of product discount functions based at least in part on at least one of input from the website merchant and the product discount task. The processor can to automatically retrieve the product discount task for the website customer based at least in part on the product displayed on the merchant website, the indication of browsing activity of the website customer, and the geographic location of the website customer. The processor can also provide a close-captioned verification code with the product discount task for a first type of the OS of the internet-enabled device, and provide a second type of verification code with the product discount task for a second type of the OS of the internet-enabled device.

In some implementations, the product discount task can include watching an advertisement for a period greater than an advertisement impression period. The processor can determine if the website customer watched the advertisement for a period greater than the advertisement impression period. The processor can also automatically select the one of the plurality of product discount functions based at least in part on whether or not the website customer watched the advertisement for a period greater than the advertisement impression period. The processor can also record, in the memory, an indication of whether or not the website customer purchased the product at the discounted price, and can automatically adjust the one of the plurality of product discount functions in response to the indication of whether or not the website customer purchased the product at the discounted price. The processor can also automatically select the discounted price based at least in part on whether another website customer has successfully completed another product discount task.

Systems and methods described herein can also facilitate a process for verifying that an entity attempting to qualify for a dynamically calculated discount offered on a product displayed via a graphical user interface (GUI) is human. The process can include receiving, from an entity, a request for a discounted price on the product displayed via the GUI. The process can also include, in response to the request for the discounted price, displaying, to the entity via the GUI, a product discount task and a verification code. The process can also include providing, to the entity via the GUI, a verification question based on the verification code and possible answers to the verification question. The process can also include receiving, from the entity via the GUI, a selected answer from among the possible answers to the verification question, and automatically determining a response time associated with receiving the selected answer. The process can also include automatically determining that the entity is human if the response time is above a predetermined threshold, and providing the discounted price to the entity in response to determining that the entity is human.

In some implementations, the process can include providing the verification code comprises displaying, to the entity via the GUI, a hidden entry imperceptible to humans and perceptible to computers, and providing the possible answers include providing at least one answer representative of the hidden entry. The process can also include automatically determining that the entity is a computer if the selected answer is the at least one answer representative of the hidden entry. The process can also include determining a number of total product discount tasks completed by the entity, and automatically determining that the entity is a computer if the number of total product discount tasks is above a predetermined threshold.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are for illustrative purposes and are not intended to limit the scope of the inventive subject matter described herein. The drawings are not necessarily to scale; in some instances, various aspects of the disclosure herein may be shown exaggerated or enlarged in the drawings to facilitate an understanding of different features. In the drawings, like reference characters generally refer to like features (e.g., functionally similar and/or structurally similar elements).

FIG. 2 is a schematic diagram illustrating technology stacks for the discount management server and the client device, according to an embodiment.

FIGS. 9A-C are screenshot diagrams illustrating shape identification product discount tasks in a web browser, according to an embodiment.

FIG. 11 is a screenshot diagram illustrating a merchant website shopping cart, according to an embodiment.

DETAILED DESCRIPTION

It should be appreciated that all combinations of the foregoing concepts and additional concepts discussed in greater detail below (provided such concepts are not mutually inconsistent) are contemplated as being part of the disclosure herein. In particular, all combinations of claimed subject matter appearing at the end of this disclosure are contemplated as being part of the disclosure herein. It should also be appreciated that terminology explicitly employed herein that also may appear in any disclosure incorporated by reference should be accorded a meaning most consistent with the particular concepts disclosed herein.

Systems and methods disclosed herein provide advantages including, but not limited to, providing merchants with competitive price advantages, as product discount tasks can generate revenue that can be used to provide larger discounts for various products; using user geolocation data and/or other data (such as which products users are requesting discounts for, how many times users attempt to obtain discounts on products, and/or the average accepted discount price), e.g., to determine how to more efficiently calculate product discounts that website customers will accept; allowing merchants to provide different discount values to different website customers, e.g., based on how much time the website customers are willing to devote towards obtaining such discounts (and/or based on how much revenue the merchants obtain from said website customers), and/or to provide efficiency to the physical store shopping experience, such that merchants can better serve both online customers and offline customers.

Website Customer Client Devices and Discount Management Servers

Figure 1:
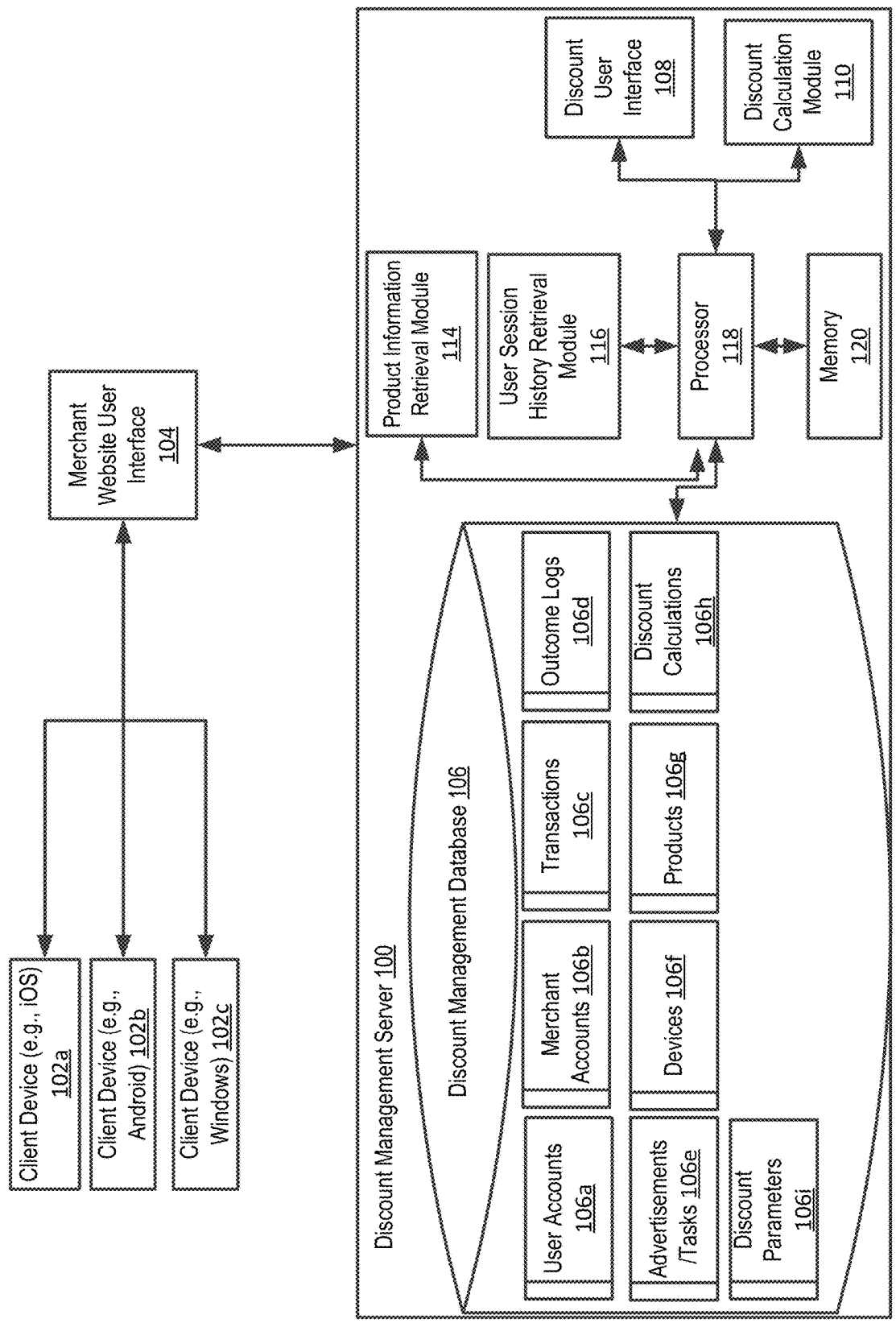
FIG. 1 is a schematic diagram illustrating a discount management server and a client device, according to an embodiment.

FIG. 1 is a schematic diagram illustrating a discount management server and a client device. In some implementations, for example, a user can use a client device 102*a-c* (collectively, "client devices 102") to interact with a merchant website user interface 104. The client device 102 can be any computing device, e.g., such as a computing device including at least one memory, at least one processor, and at least one display (e.g., within the client device 102 and/or operatively coupled to the client device 102). The client device 102 can be, for example, a mobile device (e.g., a mobile phone such as a smartphone, a tablet, and/or a like device, running iOS 102*a*, Android 102*b*, Windows Phone, and/or a similar mobile device Operating System (OS)), and/or a personal computer (e.g., a laptop and/or desktop machine running Windows 102*c*, MacOS, Linux, and/or a similar desktop OS). The client device can include a camera for taking pictures of products, bar codes, Quick Response (QR) codes, etc.; an optional dedicated barcode scanner; a near-field communication (NFC) scanner; and/or similar data acquisition devices for capturing data (such as product data and/or product images) for identifying products.

The client device 102 can also include a mobile application executable by the at least one processor. The mobile application can display a user interface through which the user can navigate through product data, perform product discount tasks for obtaining product discounts, and purchasing products (e.g. using obtained discounts or without using product discounts). The client device 102 may render the user interface via a display and/or speaker(s) and receive user input via a keyboard, mouse, touch screen, etc. In some implementations, product discount tasks can include completing a survey, signing up for an email list, viewing an advertisement, signing up for a merchant rewards program, providing additional information about the user, and/or similar tasks.

A merchant website user interface 104 can display product details from a merchant or a plurality of merchants. The merchant website user interface 104 can be integrated into the mobile application as described above, implemented as the mobile application as described above, and/or implemented a separate user interface, e.g., a webpage hosted by a discount management server 100 and accessible by a web browser implemented on the client device 102*a-c*. The merchant website user interface 104 can be accessed by the client device 102*a-c* and can retrieve data (including product data, transaction data, product discount information, and/or related information) from the discount management server 100 to provide to a user.

The discount management server 100 can include a discount management database 106, at least one processor 118, at least one memory 120. The discount management server 100 can also include a number of modules implemented in hardware (e.g., in a circuit and/or other hardware device including at least one memory and/or at least one processor), software (e.g., in software code, a software object, and/or the like) implemented on hardware, such as a memory and/or a processor, or both hardware and software. Example modules include a discount user interface 108, a discount calculation module 110, a product information retrieval module 114, and a user session history retrieval module 116. The discount management server 100 can use data in the discount management database 106 and the modules to obtain product information, calculate product discounts based on user data, store product, user, discount, and/or other information, and/or provide data to the merchant website user interface and/or the user.

The discount management database 106 can include multiple tables including data used throughout the system. For example, the discount management database 106 can include a user accounts table 106*a*, a merchant account table 106*b*, a transactions table 106*c*, an outcome logs table 106*d*, an advertisement and/or other product discount tasks table 106*e*, a devices table 106*f*, a products table 106*g*, a discount calculations table 106*h*, and/or a discount parameters table 106*i*. The user accounts table 106*a* can include data about users in the system, and can include fields such as (but not limited to): user_ID, user_provider (e.g., a cellular network and/or internet provider to which the user's client device 102*a-c* is connected), user_email_address, user_password, user_registration_date, verification_hash, forgot_password_hash, user_role, aws_bounce_complaint_date, asw_bounce_complaint_type, aws_bounce_complaint_subtype, user_email_enabled, user_first_name, user_last_name, user_middle_name, user_gender, user_date_of_birth, user_address, user_city, user_country_region, user_postal_code, user_home_phone, user_mobile_phone, user_education_level, user_employer_name, user_employer_industry, user_verified_status, user_locale, user_link, user_create_date, user_create_user, and/or user_is_enabled fields.

A merchant account table 106*b* can include data about merchants who offer product discounts on products, and can include fields such as (but not limited to): merchant_ID, merchant_location, merchant_email, merchant_address, merchant_category, merchant_password, merchant_registration_date, merchant_phone, and/or merchant_products fields. A transactions table 106*c* can include data about purchase transactions made through the merchant website user interface, and can include fields such as (but not limited to): tr_ID, tr_date, tr_transaction_total, tr_user_ID, tr_merchant_ID, tr_products, tr_discount, and/or tr_location fields.

An outcome logs table 106*d* can include logs about various events which occur at the discount management server 100 and/or the merchant website user interface 104, and can include fields such as (but not limited to): ol_ID, ol_name, ol_type, ol_date, ol_user_ID, ol_session_ID, ol_merchant_ID, ol_merchant_name, ol_product_ID, ol_product_manufacturer_name, ol_product_name, ol_product_category, ol_product_price, ol_extension_event_hash, ol_discount_percentage, ol_discount_outcome, ol_answered_correctly, ol_ad_impression_registered, ol_as_provider, ol_coupon_code, ol_coupon_expiry, ol_is_enabled, ol_create_date, and/or ol_create_user fields. An advertisements and/or product discount task table 106*e* can include data for various product discount tasks, and can include fields such as (but not limited to): pdt_ID, pdt_name, pdt_type, pdt_content, pdt_shape_type, pdt_shape_location, pdt_questions, pdt_answers, pdt_duration, and/or pdt_OS fields.

A devices table 106*f* can include data for various user devices, and can include fields such as (but not limited to): device_ID, device_name, device_make, device_model, device_type, device_OS, device_user_ID, and/or device_location fields. A products table 106*g* can include data for various products, and can include fields such as (but not limited to): product_ID, product_name, product_merchant_ID, product_type, product_price, product_discount_limit, product_SKU, and/or product_locations fields. A discount calculations table 106*h* can include calculating product discounts, and can include fields such as (but not limited to): dc_ID, dc_type, dc_formula, dc_parameters, and/or dc_limit fields. A discount parameters table 106*i* can include data for parameters used to calculate discounts, and can include fields such as (but not limited to): dp_ID, dp_vendor ID, dp_min_discount, dp_max_discount, dp_avg_discount, dp_beta, dp_alpha, dp_gamma, dp_start_date, dp_end_date, dp_custom_discount_product_ID, dp_custom_discount_start_date, dp_custom_discount_end_date, dp_is_enabled, dp_create_date, and/or dp_create_user fields.

A discount user interface 108 can be an interface which can allow a user to view and interact with various product discount tasks and to obtain product discounts. For example, the discount user interface 108 can display product discount task videos and/or images, and/or other product discount types, and can allow a user to answer a question and/or set of questions about the product discount task. The discount user interface 108 can provide the resulting product discount to the discount management server 100 and/or the merchant website user interface 104. The discount user interface 108 can be an interface overlay on top of the merchant website user interface 104, and/or can be a separate user interface to which the user redirects when the user chooses an option to obtain a discount.

A discount calculation module 110 can use product discount and/or user data from the discount management database 106 to select a discount calculation function to use in calculating a product discount, and to calculate product discounts for the user in response to the user completing a product discount task. For example, the discount calculation module 110 can use information collected from the product discount task, user information, and a product discount calculation, to calculate discounts for the user. The discount calculation module 110 can also take into account information collected by the website customer's user browser session cookie (e.g., pricing data for a product at other merchant websites) to adjust the discount calculation.

For example, pricing data from the user browser session cookie can indicate that a laptop the website customer is obtaining a discount for has been sold on electronics store websites for $500, $650, and $550. The discount calculation module 110 can adjust the discount calculation function such that the website customer is offered a discount based on these other prices (e.g., less than or equal to the lowest price found for the product (e.g., $500) or less than or equal to the mean price found (e.g., $567)). The discount calculation module 110 can also adjust the calculation of the product discount based on the prices obtained from the user browser session cookie data. A website customer performing a number of product discounts can also cause the discount calculation module 110 to adjust the discount calculation function such that the website customer can receive product discounts which are proportional and/or related to the number of product discount tasks the website customer has performed.

In some implementations, the discount calculation module 110 can take into account revenue being generated by the product discount task performed by the website customer, and/or performed by multiple website customers. For example, each time a website customer passes on a presented product discount, the advertisement revenue generated by the completion of the product discount task used to generate the product discount can be accumulated, to present a new higher discounted price to the next website customer to ask for a discount on the product.

In addition to the advertising revenue, the discount calculation module 110 can also take into account how much a physical store would like to contribute to discounting. For example, instead of offering 20% off the entire stores' product selection, the physical store can allow the discount calculation module 110 to apply the 20% discount limit to discount calculation. This can increase the discounts given out to website customers, and can stretch any money provided by the physical store towards providing discounts to website customers, as the discount calculation module 110 can ensure that the average discount price provided to website customers stays at or below 20%, while having the flexibility to provide higher and/or lower discounts to different website customers, e.g., based on the amount of revenue they generate by performing product discount tasks, and/or the like. The physical store could also choose to incentivize different products by different amounts, in addition to providing different discounts to different website customers.

The discount calculation module 110 can use revenue generated by completion of product discount tasks, an amount a merchant wishes to pay for website customer discounts, and/or an amount the manufacturer wishes to pay for website customer discounts, in addition to website customer data, to calculate product discounts. For example, merchants and/or manufacturers can, via a merchant and/or manufacturer interface hosted by the discount management server 100, select how much money they would contribute to discounts for each product. Each time the website customer attempts to obtain a discount on a product, the discount calculation module 110 can compute a new variable discount. Further information of how product discount can be calculated can be found in FIGS. 3A-B and FIGS. 5-6B.

A product information retrieval module 114 can retrieve product data from a number of merchant servers and/or from other external sources. For example, the product information retrieval module 114 can use scanned product data from the website customer's mobile device, merchant data, and/or other data to request more data about a product (such as the product's price, Stock Keeping Unit (SKU) data, and/or other data) from a merchant server, from an external source (e.g., a search engine source such as Google, Yahoo!, or Bing, and/or a social network source such as Pinterest). A user session history retrieval module 116 can manage retrieval and storing of data obtained by a user session browser cookie installed on the client device 102a-c. The user session bowser cookie can collect user session data (such as browsing history) while the website customer shops at the merchant website user interface. The browsing history can include prices for products the website customer has viewed on other websites, types of products that the website customer has viewed and/or for which the website customer has obtained discounts on other websites, and/or the like. The user session history retrieval module 116 can provide the user session browser cookie data to the discount calculation module 110, e.g., as a factor used to determine a product discount.

Technology Stacks for Client Devices and Discount Management Servers

FIG. 2 is a schematic diagram illustrating an example technology stacks for the discount management server 100 and the client device 102a-c. For example, in some implementations, the systems and methods described herein can implement a client device technology stack 202, a web server technology stack 210, and/or a database technology stack 224, e.g., to assign portions of system tasks to components of the discount management server 100 and/or the client device 102a-c configured to efficiently execute the system tasks. For example, the client device technology stack 202 can include technology configured to efficiently facilitate rendering of the merchant website user interface 104, and/or for receiving data from the discount management server 100. The client device technology stack 202 can include, for example, an HyperText Markup Language (HTML) layer 204, e.g., for rendering a merchant website user interface 104, a Javascript layer (and/or a similar client-side web application coding platform) 206, for implementing functionality of the merchant website user interface 104, a Bootstrap, Foundation, and/or similar client-side web application framework 208, e.g., for efficient use of client device memory and/or like client device resources, and/or Syntactically Awesome Stylesheets (SASS), Cascading Style Sheets (CSS), and/or similar HTML styling technology 210, e.g., for defining the layout and/or style of the merchant website user interface 104.

The web server technology stack 210 can include technology configured to efficiently process and/or manage data received at the discount management server 100. For example, the web server technology stack 210 can include an Nginx, Apache, Lighttpd, Puma, and/or a similar high-performance, per-core HyperText Transfer Protocol (HTTP) server system 212, e.g., for handling server requests and/or other functionality of the discount management server 100. The web server technology stack 210 can also include Express.js, Koa, Hapi, and/or a similar server-side web application framework 214, e.g., for handling web application functionality. The web server technology stack 210 can also include Memcached and/or a similar sever-side technology for storing and/or rapidly querying session-based data 216, e.g., from a discount browsing session cookie installed at a client device 102a-c. The web server technology stack 210 can also include Node.js, Ruby, Python, PHP, and/or a similar high-concurrency, server-side functional programming language 218, e.g., for implementing discount management server 100 functionality. The web server technology stack 210 can also include AWS Load Balancing, Heroku, Backspace, and/or a similar technology 220 for efficiently distributing web traffic to and/or from the discount management server 100. The web server technology stack 210 can also include AWS Ecs Linux Web servers, and/or similar high-performance server systems 222 to serve as the underlying hardware for the discount management server 100.

The database technology stack 224 can include technology configured to efficiently process data stored at the discount management server 100. For example, the database technology stack 224 can include AWS DynamoDB 226 and/or similar technology for providing high-performance, low-latency, input-only data recording technology for storing data, e.g., such as but not limited to logging user activity and/or other outcome log data. The database technology stack 224 can also include MongoDB 228 and/or similar technology for providing high-performance, low-latency, input/output data recording technology, e.g., for querying the discount management database 106 for user profile data, product discount task data, and/or other discount management data. The database technology stack 224 can also include Postgres, MySQL, and/or a similar relational database platform 230, e.g., for linking records together, and/or otherwise managing records within the discount management database 106.

Generating Product Discounts

Figure 3A:
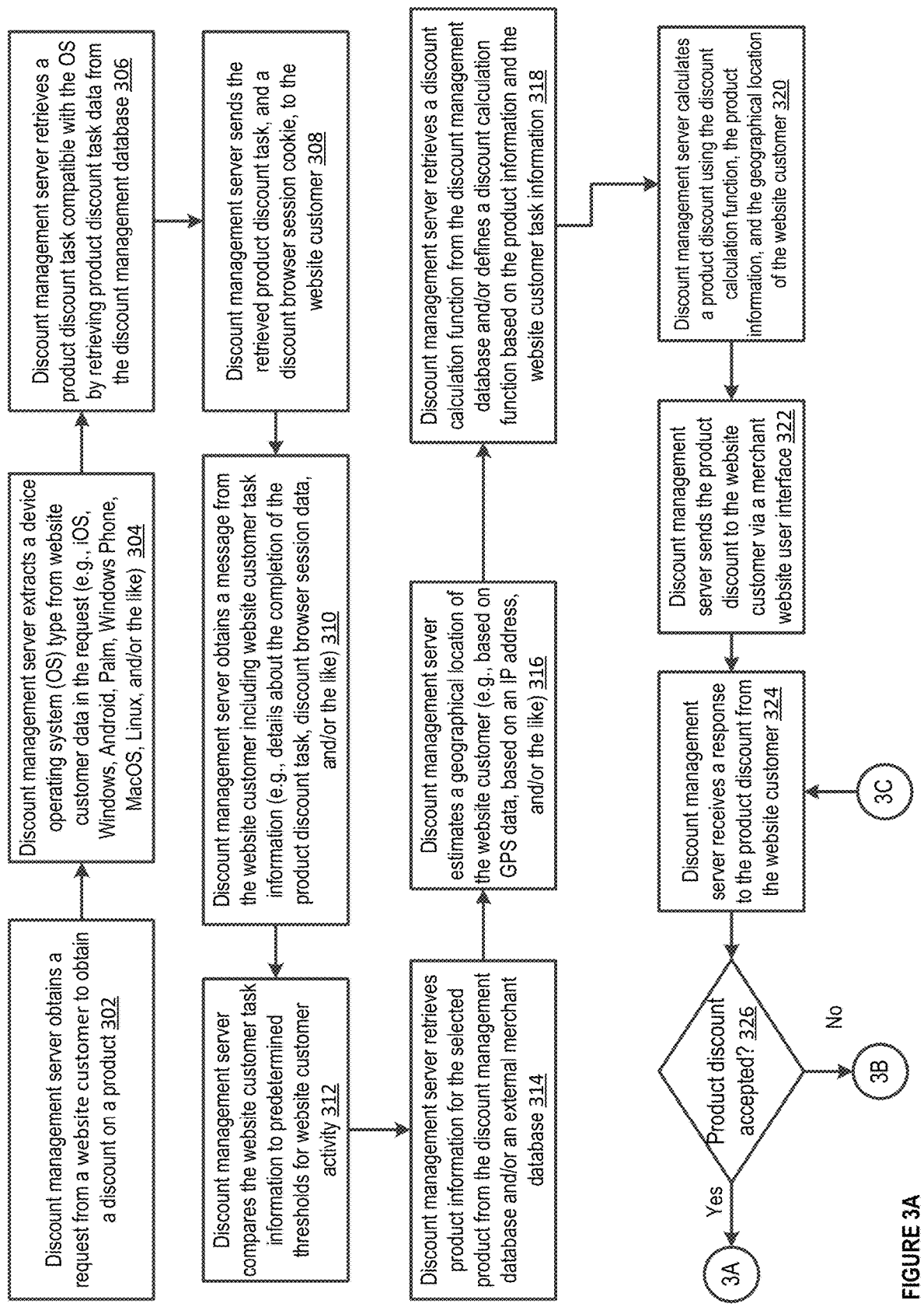
FIGS. 3A-B are logic flow diagrams illustrating generating a product discount, according to an embodiment.
Figure 3B:
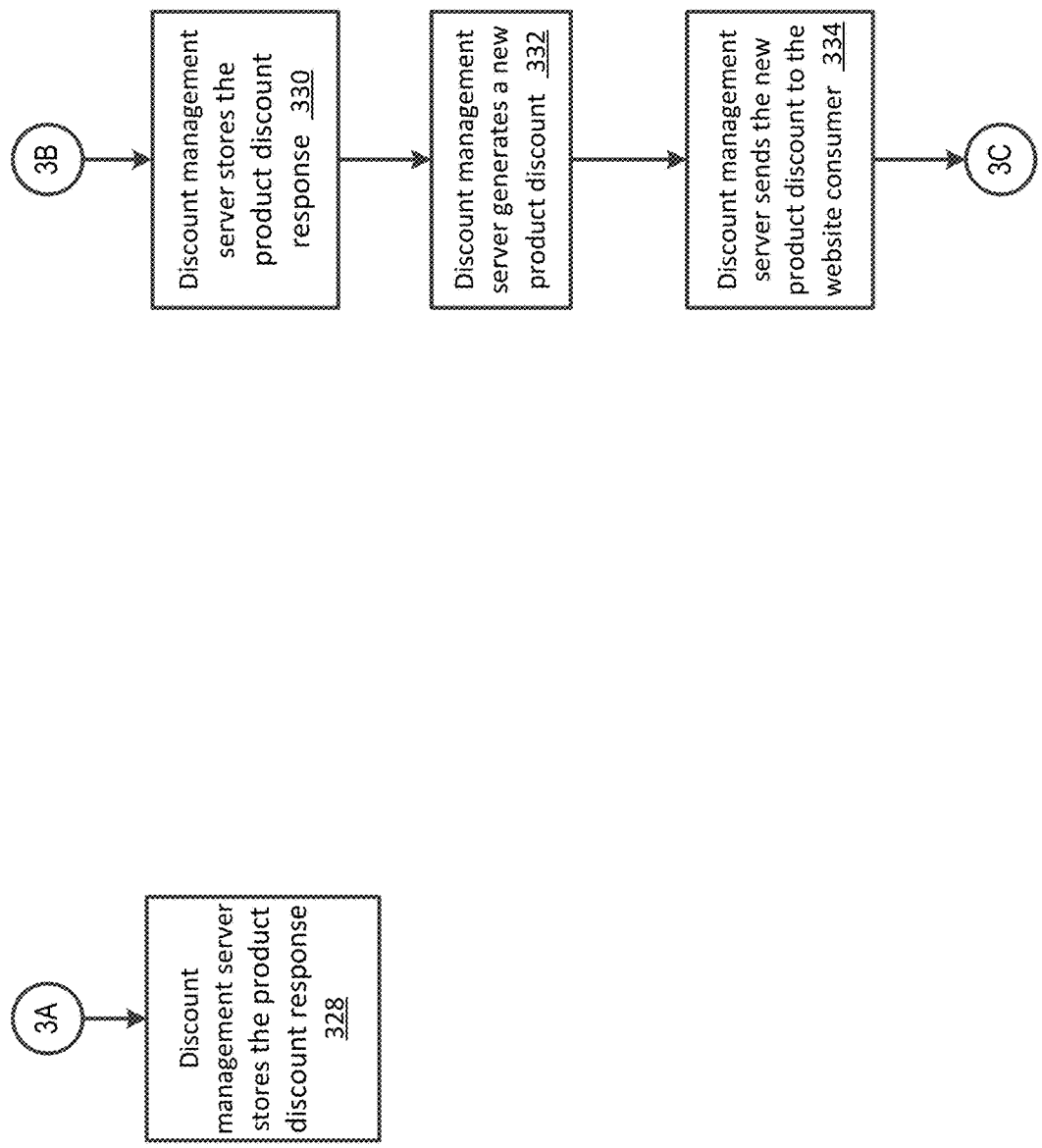

FIGS. 3A-B are logic flow diagrams illustrating generating a product discount. For example, in some implementations, the discount management server 100 can obtain 302 a request from a user (also referred to herein as a website customer) to obtain a discount on a product (e.g., that the user views in the merchant website user interface 104, and/or the like). The request can include data about the product and, optionally, information about the user and the user's client device 102a-c. The request can be generated when the website customer clicks and/or otherwise interacts with a representation of a product on a merchant website user interface 104 (e.g., a merchant website and/or merchant mobile application), when the website customer selects an option to obtain a discount within the merchant website user interface 104, when the website customer obtains information about a product via a mobile device (e.g., scans and/or takes a picture of a product barcode, product QR code, and/or the product itself), when the website customer interacts with an NFC tag on the product, e.g., with the website customer's mobile device, and/or when the website customer performs a search for a product, e.g., by name, SKU code, image, and/or the like.

In response to the request, the discount management server 100 can extract 304 a device OS type from the user client device data (e.g., from a header in the request for the discount), e.g., to determine which OS (such as but not limited to iOS, Windows Phone, Android, Palm, MacOS, Windows, Linux, and/or similar OSes) is running on the website customer's client device 102a-c. As described in greater detail below, the discount management server 100 uses information about the OS of the client device to determine aspects of the product discount task and/or aspects of code used to verify that the website customer is a human and not a computer.

The discount management server 100 can then define and/or retrieve 306 a product discount task from the discount management database 106 based on the device OS type, the estimated location of the client device. For example, the discount management server 100 can retrieve a product discount task optimized for a mobile device if the website customer is using a device running iOS or Android, and/or can retrieve a product discount task optimized for a web browser if the website customer is using a device running Windows. Similarly, the discount management server 100 may retrieve a product discount task tailored to the website customer's location (more precisely, the client device's location), such as a product discount task that features an advertisement for a service available in the website customer's immediate vicinity or metropolitan area. The discount management server 100 can send 308 the product discount task and a discount browser session cookie object to the website customer, e.g., via the merchant website user interface 104 (e.g., the merchant website and/or the merchant mobile application).

The discount management server 100 can obtain 310 a message from the website customer after providing this information to the user. The message can include website customer task information, including but not limited to details about the completion of the product discount task, data from the discount browser session data, and/or additional user information that the user supplies while completing the product discount task. The website customer task information, for example, can include information on how long it took the user to complete the product discount task, how long it took the user to respond to a question about the product discount task, how many product discount tasks the user has completed (e.g., within a predetermined window of time, or total), whether there is any data in hidden website fields (e.g., see at least FIG. 4 for more information), and/or other product discount task data.

As described in greater detail below, the discount management server 100 can compare 312 the website customer task information with predetermined thresholds for website customer activity in order to determine whether or not the website customer is human. For example, the discount management server 100 can use predetermined thresholds for website customer response times to determine whether the website customer responded to the product discount task too quickly (e.g., whether the website customer's response time is too fast for a human customer, and/or the like). Such comparisons can ensure that computer entities (such as computer bots and/or similar scripts) are not attempting to gain product discounts (see at least FIG. 4 for more details).

The discount management server 100, e.g., via the discount user interface 108, can then retrieve 314 product information relating to the product for which the website customer wanted to obtain a discount (e.g., from the discount management database 106, and/or from external sources via the product information retrieval module 114 and/or via at least one merchant application programming interface (API) allowing the product information retrieval module 114 to request the product information from the external sources). The discount management server 100 can also estimate 316 the geographic location of the user (or, more precisely, the client device 102) using a suitable automatic geolocation technique. For instance, if the client device 102 is a mobile device, as indicated by its OS, then the discount management server 100 can retrieve the client device's Global Positioning System (GPS). If the client device 102 has an Internet Protocol (IP) address or is connected to the Internet via a wireless access point, then the discount management server 100 may ping the client device's IP address or the IP address of the closest server or wireless access point. The discount management server 100 may correlate the IP address returned by the client device 102, server, or wireless access point with IP geolocation data obtained from a commercial service to estimate the client device's location. In some cases, the discount management server 100 may be able to determine the client device's location to the nearest ZIP code.

In other cases, the discount management server 100 can estimate 316 the website customer's geographic location based on the website customer's interactions with known objects. If the website customer is in a store with an iBeacon or similar device, for example, the discount management server 100 may obtain or receive iBeacon data indicative of the location of the website customer's client device. Similarly, the discount management server 100 may estimate the client device's location based on data obtained during an interaction between the client device and an NFC tag on a product in the store. The discount management server 100 may also identify the client device's location based on a picture, obtained with the client device, of a barcode and/or QR code on the product or other object (e.g., data identifying the location of the store at which the product is located, and/or the location of the product within a particular store, which can be used by a store map object in the merchant website user interface 104 to locate the product in the particular store).

The discount management server 100 can retrieve 318 a discount calculation function from the discount calculation module 110, and/or can define a discount calculation function, based on the product information, the website customer task information, the geolocation information, and/or other website customer information.

The discount management server 100 can calculate 320 a product discount for the website customer, e.g., using the discount calculation function, the product information, the website customer's response to the product discount task, and/or the estimated geolocation data for the website customer. The discount management server 100 can send 322 the product discount to the website customer, e.g., by providing the product discount to the merchant website user interface 104. The discount management server 100 can receive 324 a response to the product discount from the website customer. If the website customer accepts the product discount 326, then the discount management server 100 can store 328 the product discount response in the discount management database 106, e.g., as a new event in the outcome logs 106*d* table. If the website customer does not accept the product discount 326, then the discount management server 100 can store 330 the product discount response in the discount management database 106, and can generate 332 a new product discount for the website customer using a similar process as described above. The discount management server 100 can then send 334 the new product discount to the website customer, and can determine whether the new product discount is accepted by the user.

Verifying that the Website Customer is Human

Figure 4:
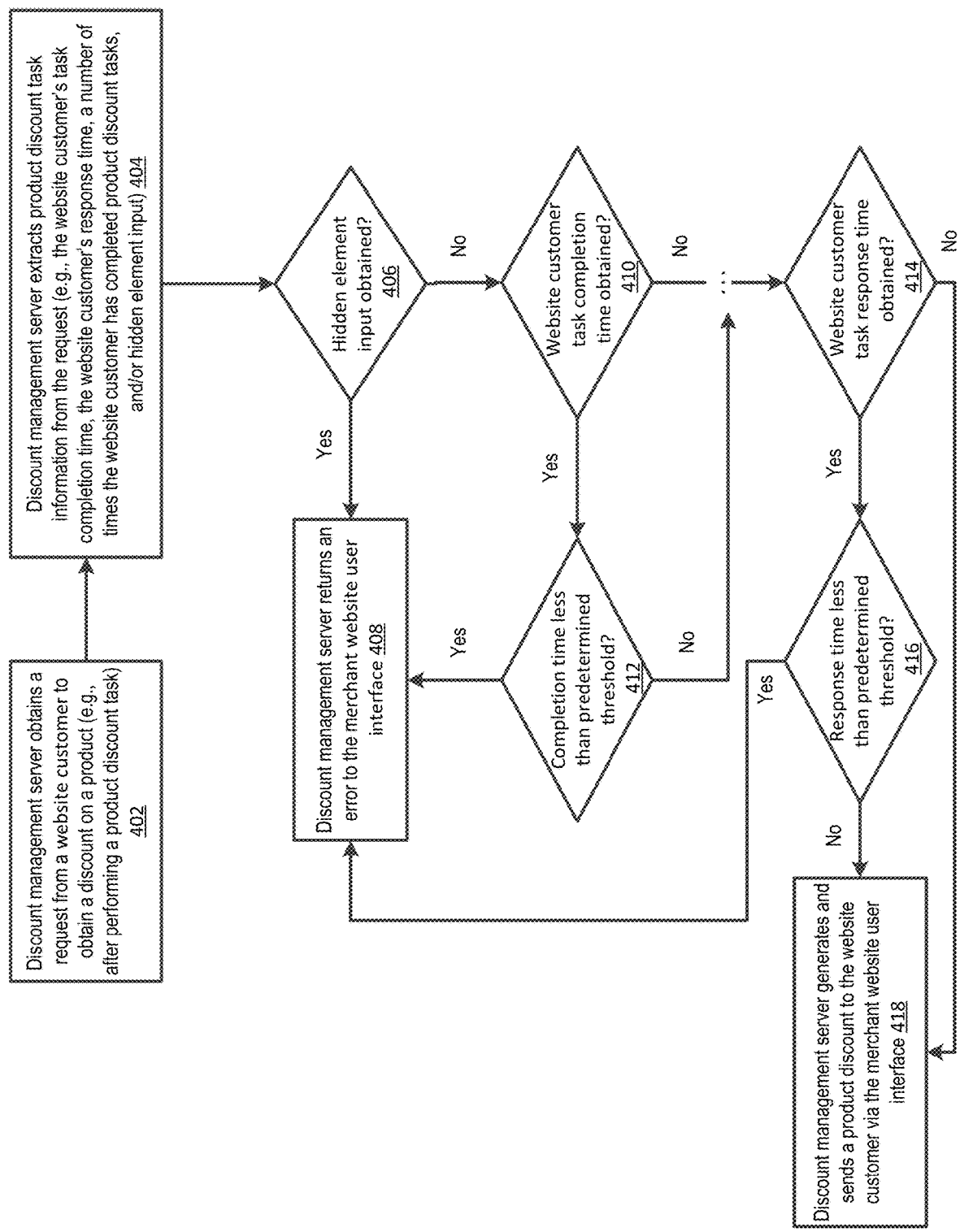
FIG. 4 is a logic flow diagram illustrating verifying whether or not a user is human, according to an embodiment.

FIG. 4 is a logic flow diagram illustrating verifying a user's entity type. For example, in some implementations, the discount management server 100 can obtain 402 a request from a website customer, e.g., to obtain a discount on a product (e.g., after performing a product discount task). The discount management server can extract 404 product discount task information from the request (such as, but not limited to, the website customer's task completion time, the website customer's response time, a number of times the website customer has completed product discount tasks, and/or hidden element input). In some implementations, the discount management server 100 can also keep track of product discount task information independently, and may not extract such information from the request. The hidden element input can be a website and/or mobile device element which would be unviewable by a human website customer, but can be viewable to a computer website customer which analyzes the merchant website user interface 104 and/or the discount user interface 108 to request product discounts. In other words, the discount management server 100 can tell whether the website customer is human or a computer depending on whether the hidden element includes input, whether the response given to a product discount task is related to content within the hidden element, and/or the like.

For example, if the website customer provides a response in the hidden element 406, the discount management server 100 may determine that the website customer is not a human. In response, it may return 408 an error to the merchant website user interface 104 to indicate that a product discount cannot be generated for the website customer. As another example, if the hidden element adds content to the product discount task (e.g., adds extra text to the product discount task, overlays a different shape on a product discount task, and/or otherwise augments and/or changes the product discount task), and if the website customer provides an incorrect response to the product discount task based on the hidden element content, the discount management server 100 may determine that the website customer is a computer, and in response may send an error message to the merchant website user interface 104.

Additionally, the discount management server 100 can determine whether a website customer task completion time was included in the request 410 and/or otherwise tracked by the discount management server 100. The website customer task completion time can include how long it took a website customer to complete a product discount task. For example, if a product discount task is completed too quickly, the discount management server 100 can determine that the website customer may be a computer instead of a human. Thus, if the discount management server 100 determines 412 that the website customer task completion time is less than a predetermined threshold of how long it should take a website customer to complete the task. If the completion time is less than the predetermined threshold, then the discount management server 100 can send 408 an error message to the merchant website user interface 104. The discount management server 100 can also determine that the website customer is a computer if the response time is too repeatable, e.g., the website customer always responds to the question with 50.0±0.5 ms.

The discount management server 100 can also determine 414 whether the request included a website customer response time, and/or if the website customer response time was otherwise tracked by the discount management server 100. Similar to the task completion time, if a website customer's response time to a question within the product discount task is below 416 a predetermined threshold, the discount management server 100 can send 408 an error message to the merchant website user interface 104. The discount management server 100 can continue to check portions of the product discount task information to determine if any of the data indicates that the website customer may be a computer entity. If, for example, there is no hidden element input, if the website customer's completion time and response time are greater than predetermined thresholds, and if other data from the product discount task information does not indicate that the website customer is a computer, the discount management server 100 can determine that the website customer is a human, and can generate and send 418 a product discount to the website customer, e.g., via the merchant website user interface 104.

Obtaining a Product Discount Via a Merchant Website User Interface

Figure 5:
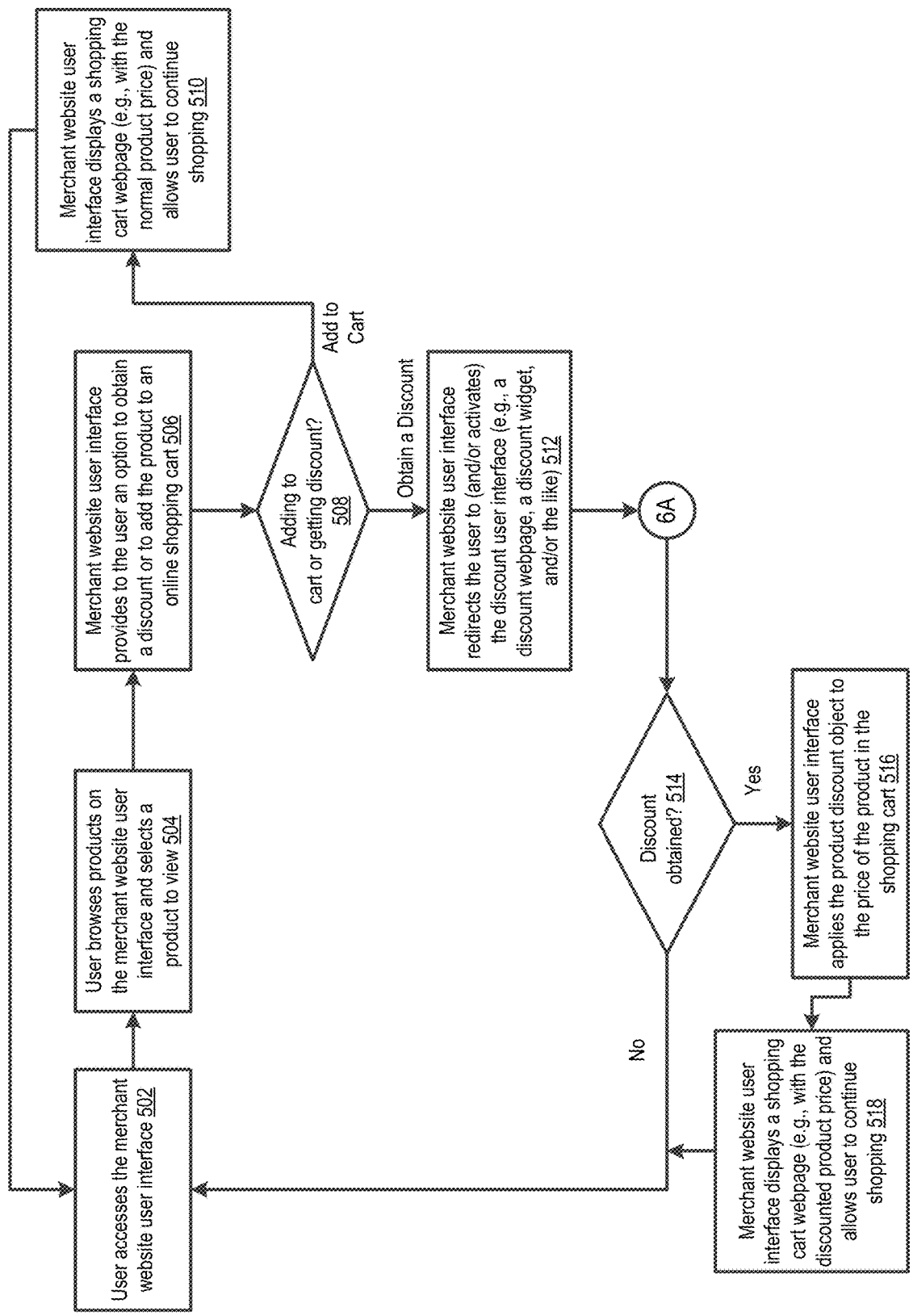
FIG. 5 is a logic flow diagram illustrating interacting with a merchant website user interface, according to an embodiment.

FIG. 5 is a logic flow diagram illustrating interacting with a merchant website user interface 104. For example, in some implementations, a website customer (e.g., a user browsing a merchant website for products) can access 502 a merchant website user interface 104. The website customer can browse 504 products on the merchant website user interface 104, and can select a product to view in more detail. In other implementations, the website customer can be browsing products in a store, and can scan products, e.g., using her mobile device, to view more information about the product in the merchant website user interface 104. The merchant website user interface 104 can provide 506 an option to the user to obtain a discount, and/or to add the product to an online shopping cart. If the merchant customer adds 508 the product to her shopping cart, the merchant website user interface 104 can display 510 a shopping cart webpage (e.g., showing the product with the normal, full product price) and allow the user to continue shopping.

Figure 6A:
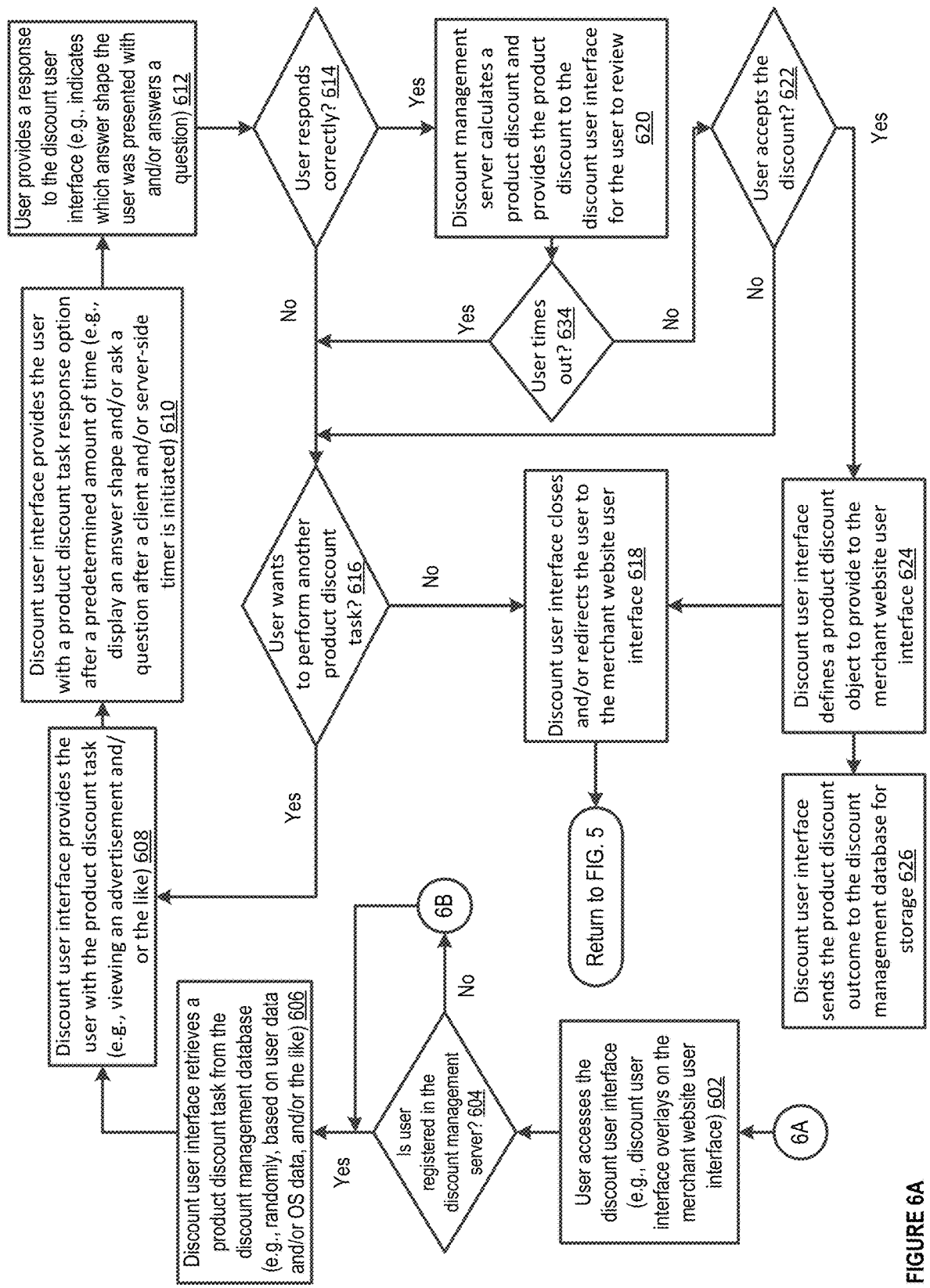
FIGS. 6A-B are logic flow diagrams illustrating generating a product discount on a merchant website, according to an embodiment.
Figure 6B:
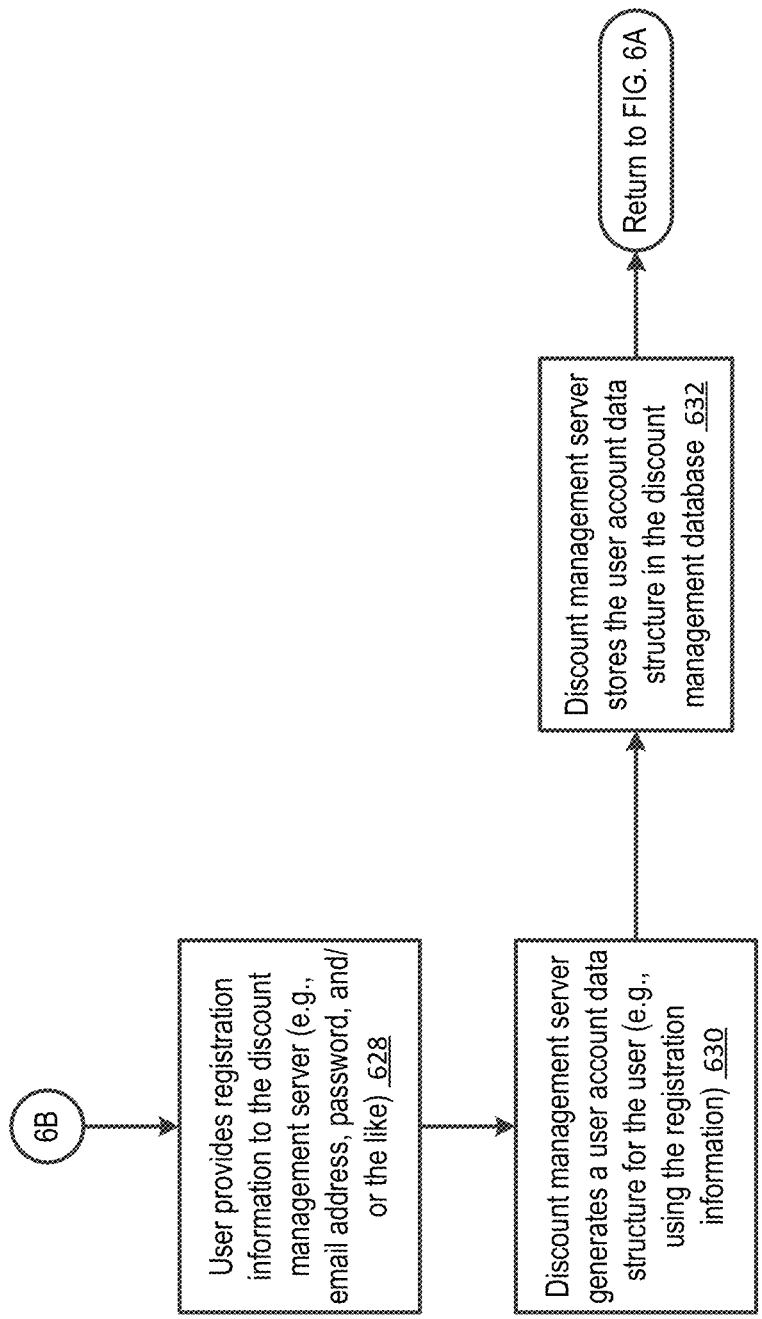

If the website customer chooses to obtain 508 a discount, the merchant website user interface 104 can redirect the user to (and/or can activate) 512 a discount user interface 108, such as a discount webpage, a discount widget, and/or a similar discount user interface 108. Referring to FIG. 6A, the website customer can access 602 the discount user interface, which can determine whether the website customer is registered with the discount management server 100. If the website customer is not registered 604 with the discount management server 100, referring to FIG. 6B, the website customer can provide 628 registration information (such as an email address a password, and/or similar user registration data) to the discount management server 100. The discount management server 100 can then generate 630 a user account data structure for the website customer using her registration information, and can store 632 the user account data structure in the discount management database 106.

Returning to FIG. 6A, the discount user interface 108 can retrieve 606 a product discount task from the discount management database 106, e.g., randomly, based on the website customer's data, based on OS data for the website customer's client device 102a-c, and/or based on similar data. The discount user interface 108 can provide 608 the website customer with the product discount task. In some implementations, the product discount task can include viewing an advertisement, viewing an image, and/or performing similar tasks. The discount user interface 108 can provide 610 the user with a product discount response option, e.g., after a predetermined amount of time. For example, the discount user interface 108 can display an answer shape within the advertisement and/or similar media that the website customer recalls when providing a response. As another example, the discount user interface 108 can provide a question to the website customer, asking the website customer about aspects of the product discount task (e.g., how many people were shown in an image, features of a product in an advertisement, and/or the like). After the website customer provides 612 a response to the discount user interface 108 (e.g., by indicating which shape the website customer was presented with, and/or by answering a question), the discount user interface 108 can determine whether the website customer answered correctly or not.

If the website customer answers 614 the question correctly, the discount management server 100 can calculate 620 a product discount, and can provide the product discount to the discount user interface 108 for the website customer to review. In some implementations, the discount management server 100 may impose a time limit on how long the website customer may consider a product discount before the product discount expires. If the website customer does not accept or reject 634 the product discount within the predetermined time limit (e.g., times out of the product discount selection process) or if the website customer declines the product discount, the discount management server 100 can determine whether or not the website customer would like to perform 616 another product discount task to obtain a new product discount. If the website customer is still within the predetermined time limit for accepting and/or rejecting 634 the product discount, the website customer can still be provided with the option to review the product discount. If the website customer accepts 622 the discount, the discount user interface 108 can define 624 a product discount object to provide to the merchant website user interface 104. The discount user interface 108 can then send 626 the product discount outcome in the discount management database 106 for storage, and can close and/or redirect 618 the user to the merchant website user interface 104.

If the website customer answered 614 incorrectly, the discount user interface 108 can determine whether the website customer wants to perform another product discount task. If the website customer would like to perform 616 another task, the discount user interface 108 can provide 608 a product discount task to the user to complete. If the website customer chooses not to perform 616 another product discount task, the discount user interface 108 may instead close, and/or redirect 618 the user to the merchant website user interface 104. Similarly, if the user declines a discount she was offered, she can determine whether she would like to perform another product discount task. If she would like to perform 616 another product discount task, the discount user interface 108 can provide 608 another product discount task to the user to complete. If the website customer does not want to perform 616 another product discount task, the discount user interface 108 may instead close, and/or redirect 618 the user to the merchant website user interface 104.

Returning to FIG. 5, in some implementations, the merchant website user interface 104 can determine whether or not the website customer obtained a discount. If the website customer did not obtain 514 a discount, the website customer can continue to browse products on the merchant website user interface 104. If the website customer obtained 514 a discount, the merchant website user interface 104 can apply 516 the product discount object to the price of the product in an shopping cart, and can display 518 a shopping cart webpage including the product at the discounted product price, and/or any other products the website customer has selected for her shopping cart. The website customer can then continue to shop on the merchant website user interface 104 to view and/or add more products for purchase. At the end of the shopping process, the website customer can check out the products in her shopping cart (e.g., including products with product discounts applied to them and products at normal price). The website customer can arrange to either have the products shipped to her, and/or can choose to pick up the product at a physical store (e.g., see FIG. 7 for more details on obtaining physical store purchases).

Obtaining a Product Discount at a Physical Store

Figure 7:
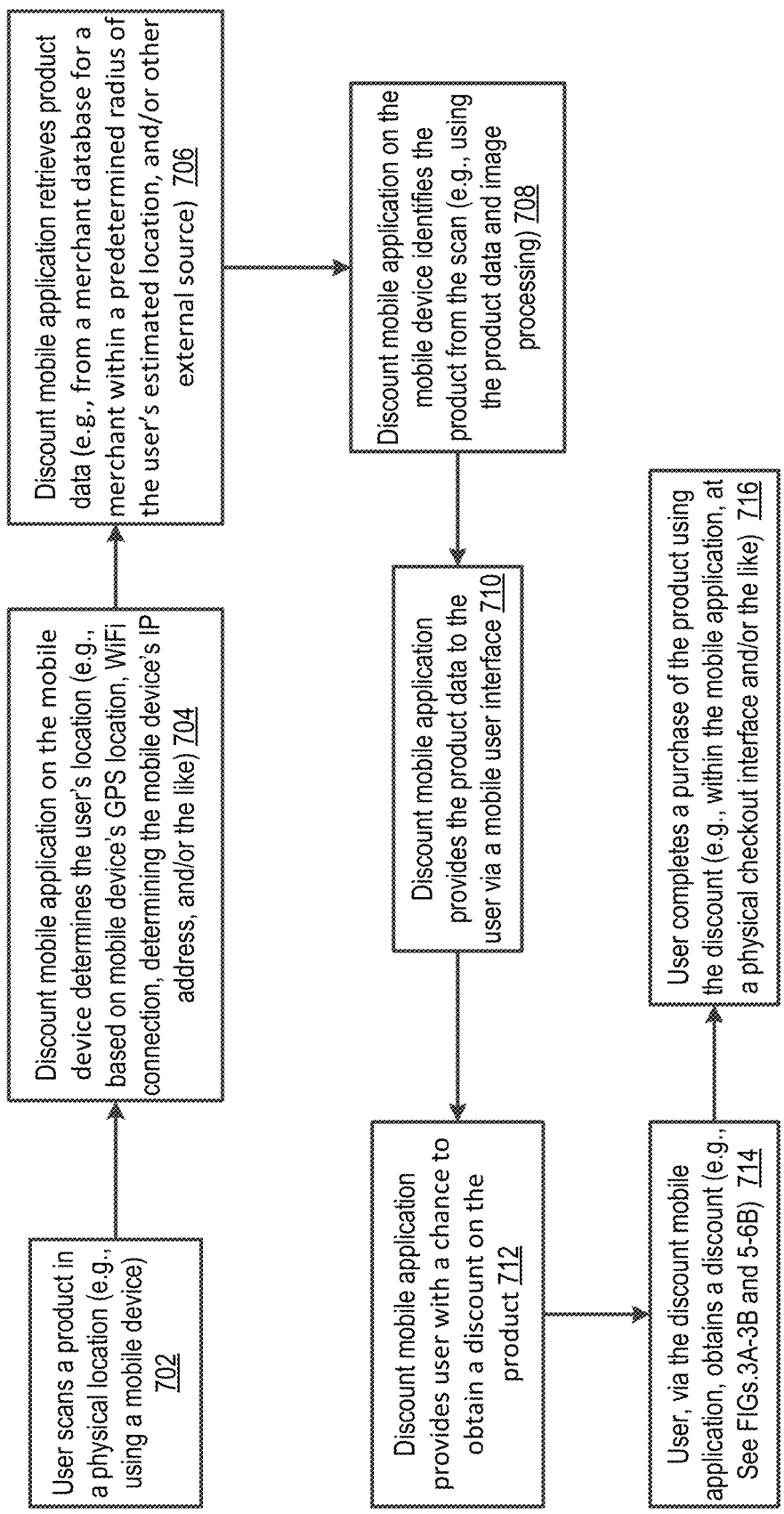
FIG. 7 is a logic flow diagram illustrating obtaining a product discount in a store, according to an embodiment.
Figure 8A:
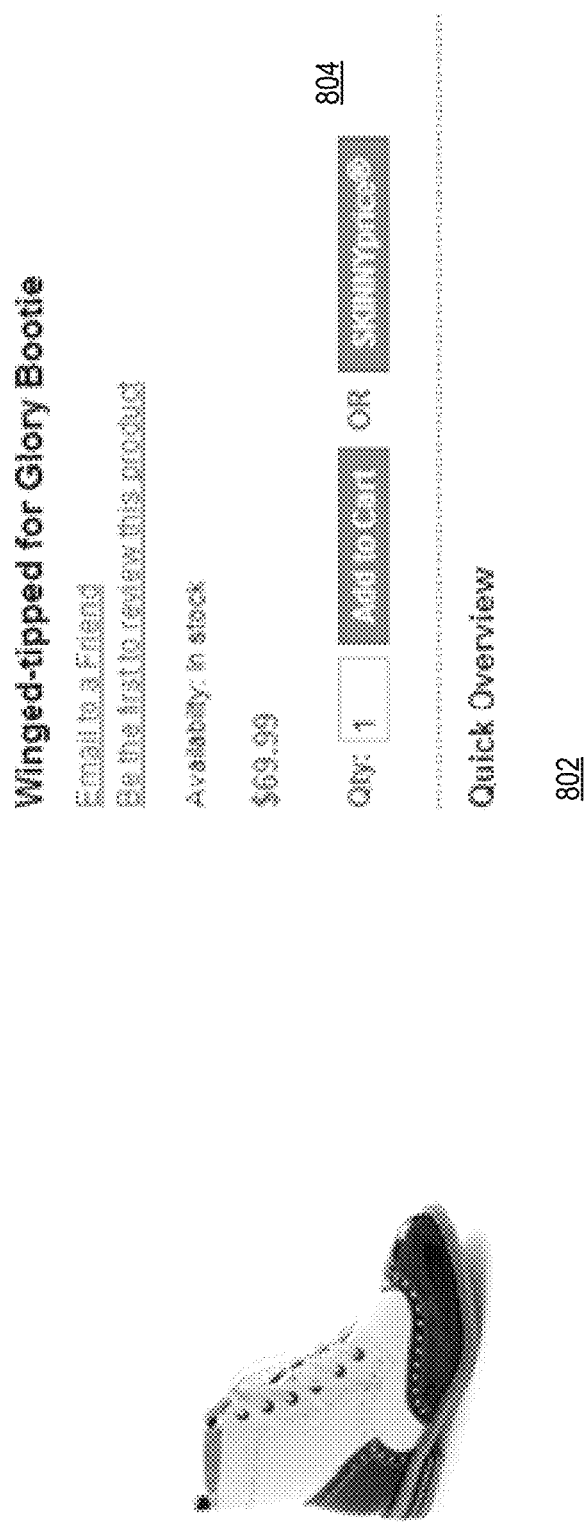
FIGS. 8A-D are screenshot diagrams illustrating question product discount tasks in a web browser, according to an embodiment.
Figure 8B:
Figure 8C:
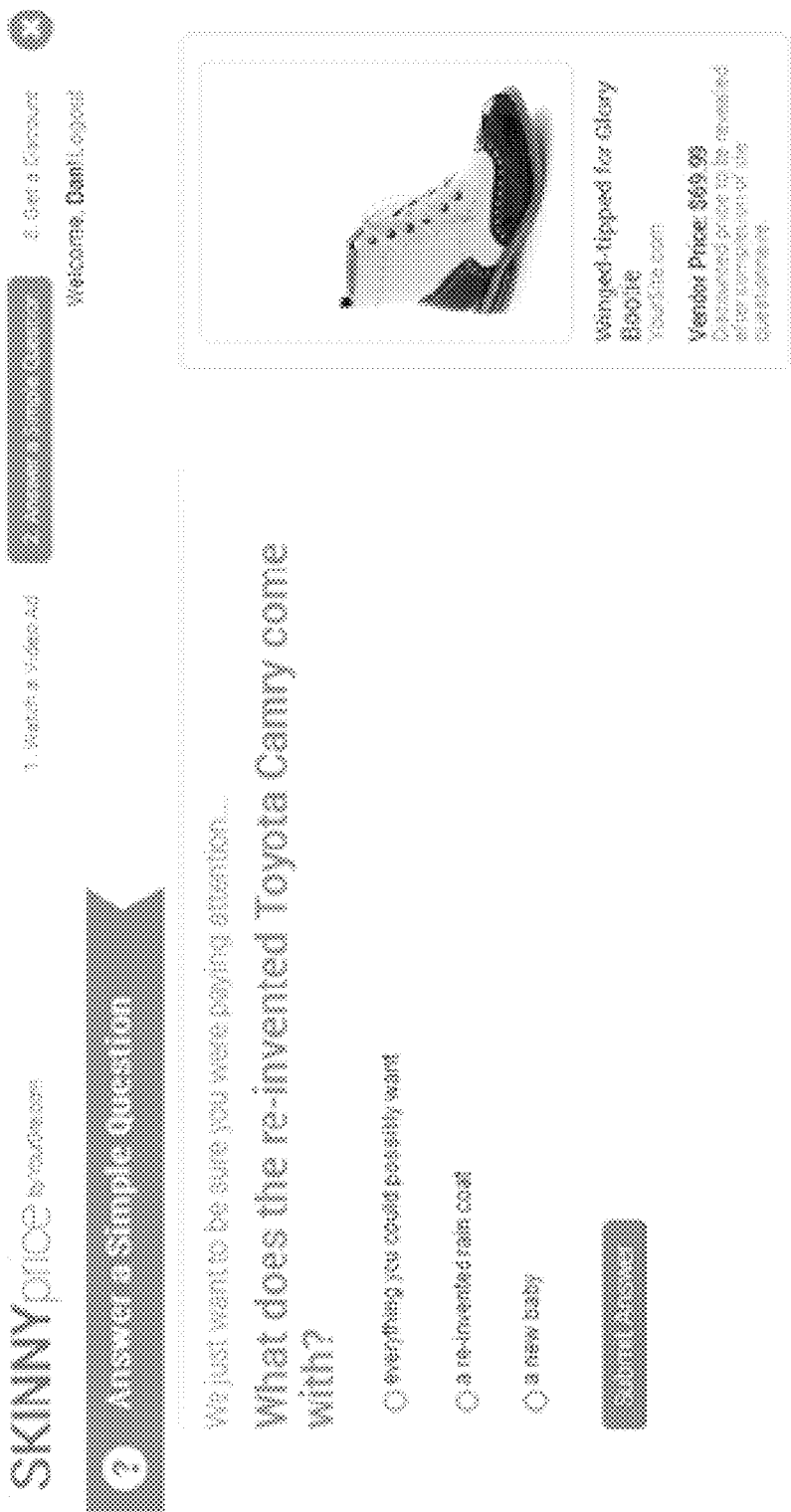
Figure 8D:
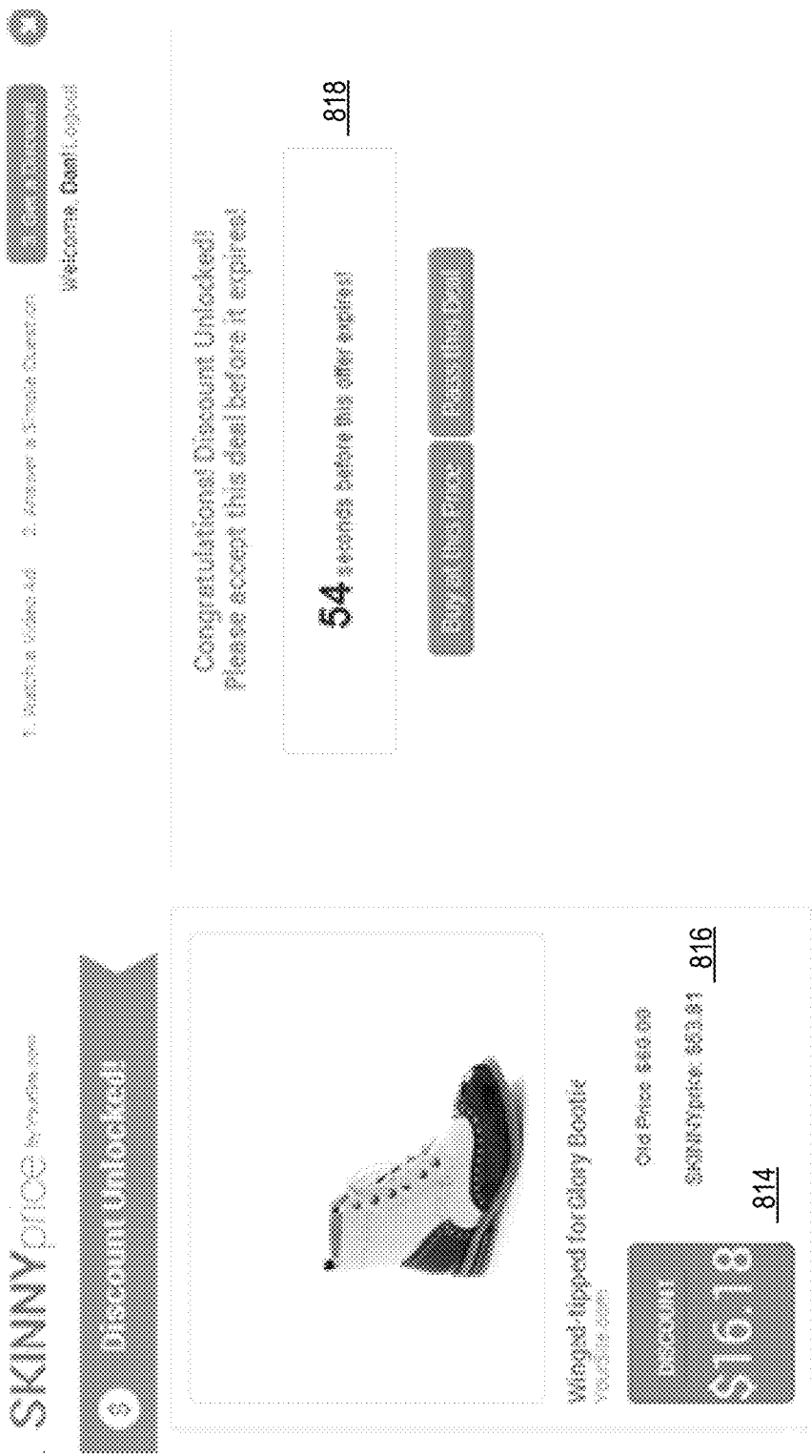

FIG. 7 is a logic flow diagram illustrating obtaining a product discount in a physical store. In some implementations, the website customer can scan 702 a product in a physical location (e.g., a brick-and-mortar store, and/or the like), using a mobile and/or similar electronic computing device. A discount mobile application on the user's mobile device determines 704 the website customer's location (e.g., based on the mobile device's GPS location, based on a Wi-Fi network to which the mobile device is connected, based on pinging the mobile device, and/or otherwise determining an IP address for the mobile device, and/or the like). The discount mobile application can then retrieve product data (e.g., from a merchant database for a merchant within a predetermined radius of the user's estimated location, and/or from another external source such as a search engine). The discount mobile application can also retrieve 706 product data from the discount management database 106 which corresponds to products in the approximate location of the mobile device. The discount mobile application can then identify 708 the product from the scan (e.g., using the product data, image processing, and/or similar techniques). The discount mobile application can provide 710 the product data to the website customer, e.g., via a mobile user interface in the discount mobile application. The discount mobile application can provide 712 the website customer with a chance to obtain a discount on the product. If the website customer would like to obtain a product, the website customer, via the discount mobile application, can obtain 714 the discount, e.g., via at least the processes described with respect to FIGS. 3A, 3B, 5, 6A, and 6B. The website customer can then complete 716 a purchase of the product using the discount.

For example, the website customer can purchase the product within the discount mobile application, and can then show a transaction receipt in the discount mobile application to personnel in a the physical store, to obtain the product while in the store. Additionally, the website customer can bring the product to a physical checkout interface (e.g., a self-checkout interface, a cashier, and/or a similar interface). In some implementations, the website customer can purchase the product at full price at the physical store, and can obtain a discount for a predetermined amount of time after the purchase was made. The website customer can take a photo of, and/or scan a physical receipt, and/or can import an email receipt into the discount user interface 108, to provide product information to the discount user interface 108. The website customer, via the discount user interface 108, can then obtain a discount for the product after the website customer has purchased the product. When the website customer obtains the discount, the website customer can obtain a credit on the payment device used to purchase the product, can obtain cash and/or a check via a mail rebate for the value of the discount, and/or can obtain a coupon and/or similar credit for a future purchase at a merchant. In some implementations, the rebate and/or coupon or credit can have an expiration date and/or time. For example, the discount object stored in the discount management server 100 (e.g., within the website customer's account record) may include an expiration date field after which the coupon and/or credit can be removed from the website customer's account. Additionally, a mail rebate may include an expiration date printed on it, such that it can be denied if mailed and/or received after the expiration date.

As an example, a website customer can purchase a laptop in a physical electronics store for $500. The website customer, after making the purchase, can attempt to obtain a discount on the laptop, e.g., by taking a picture of her physical receipt with a mobile device, and/or scanning the barcode of her purchased product, along with another barcode and/or other code indicating that the product has been purchased. The discount user interface 108 can use the product information obtained from the receipt and/or the scan to determine the product's price, and/or to determine other aspects of the product. The discount user interface 108 can provide a product discount task to the mobile device that the website customer can complete, and the 108 can use the product data (and/or other website customer-related data) to calculate a discount of $10 for the website customer. If the website customer accepts the discount, the discount user interface 108 can instruct the discount management server 100 to initiate a transaction to credit $10 to a payment device included in the website customer's user account. The discount management server 100 can also generate a $10 discount coupon code and/or object that the website customer can use in a future purchase. The discount coupon can expire after three months, after which point the discount coupon may not be applicable to future purchases. The discount management server 100 can also generate a $10 discount mail-in-rebate form that the website customer physically mails to the electronics store, to receive a $10 credit and/or payment from the electronics store.

Product Discount Task Interfaces

Figure 9A:
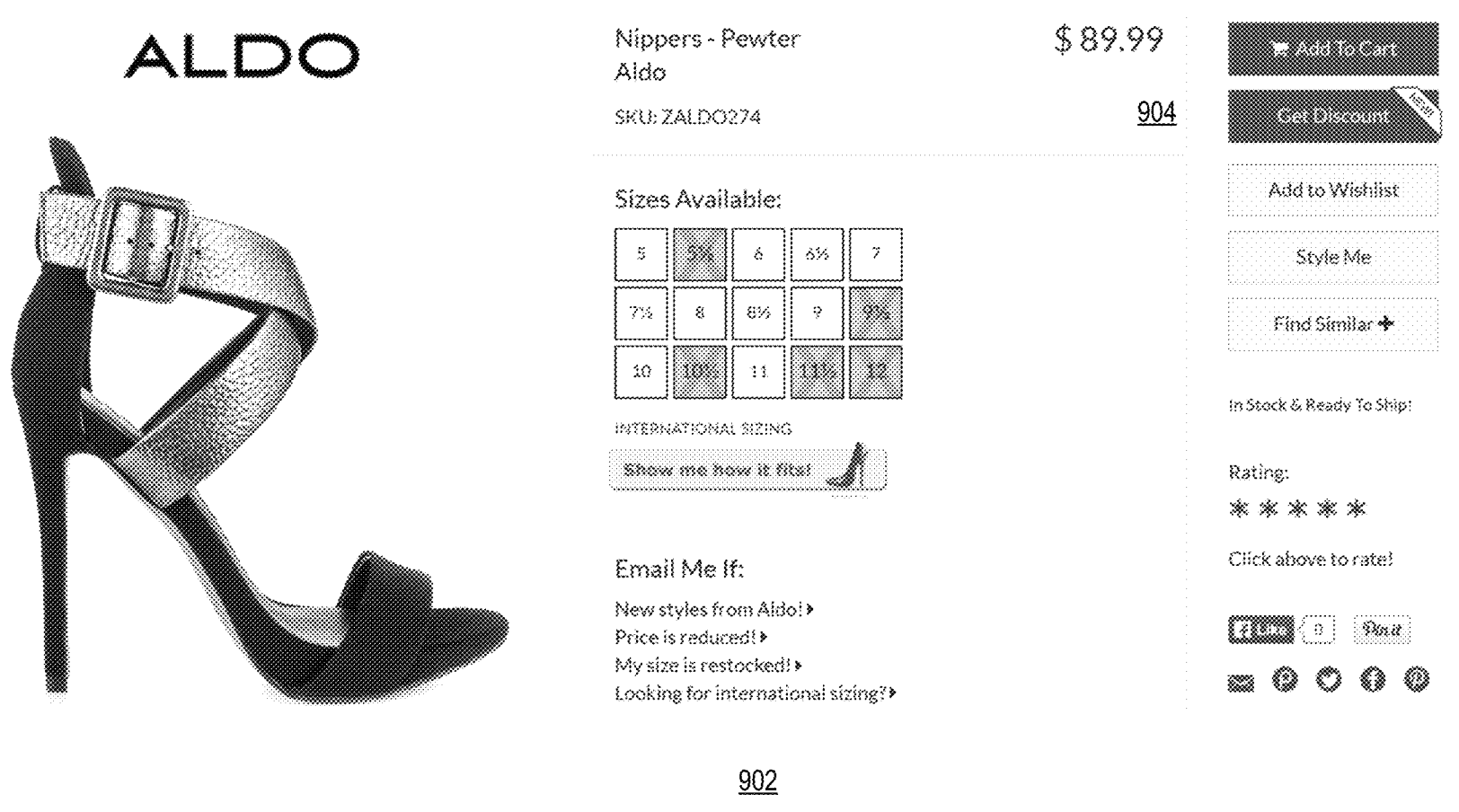
Figure 9B:
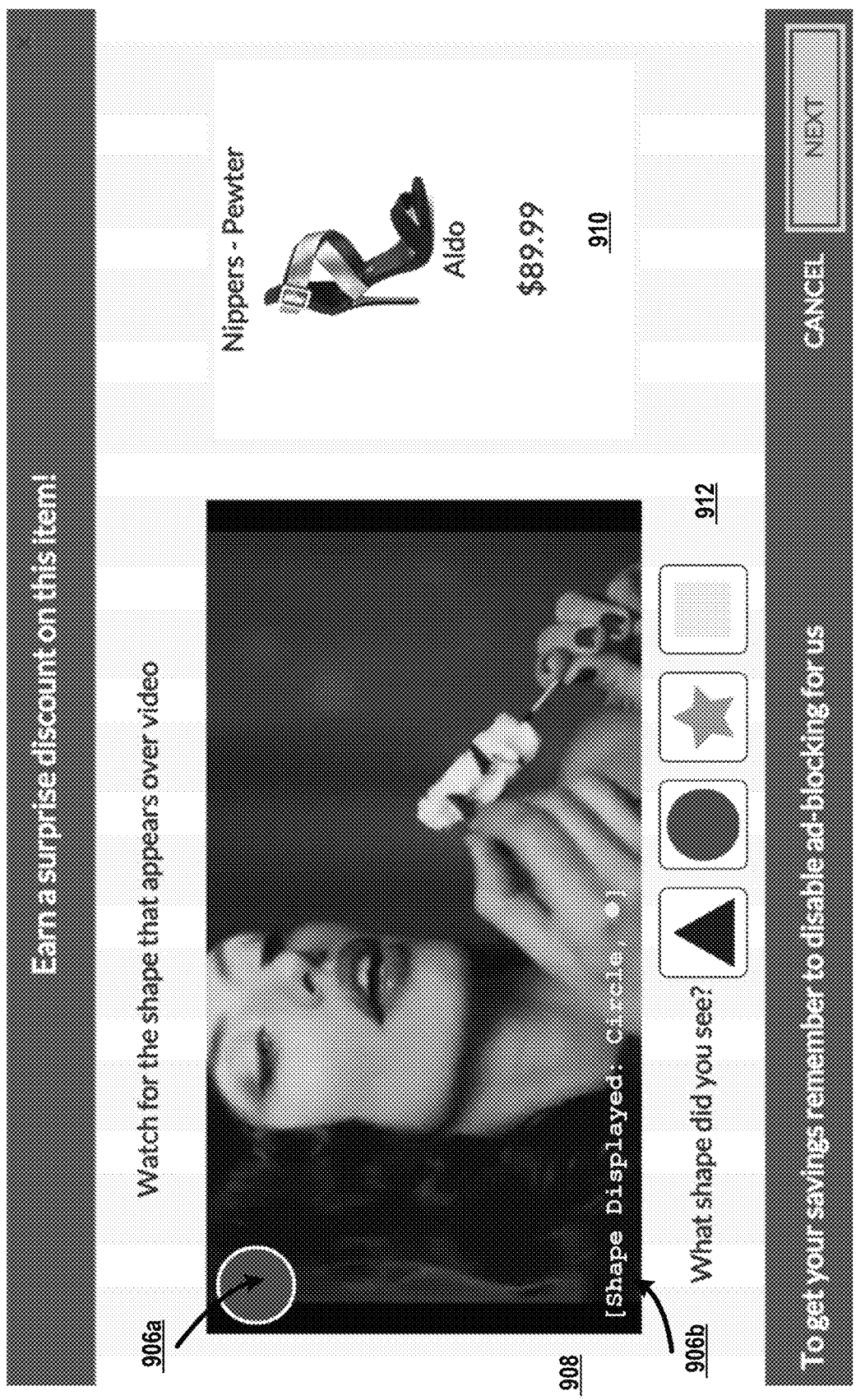
Figure 9C:
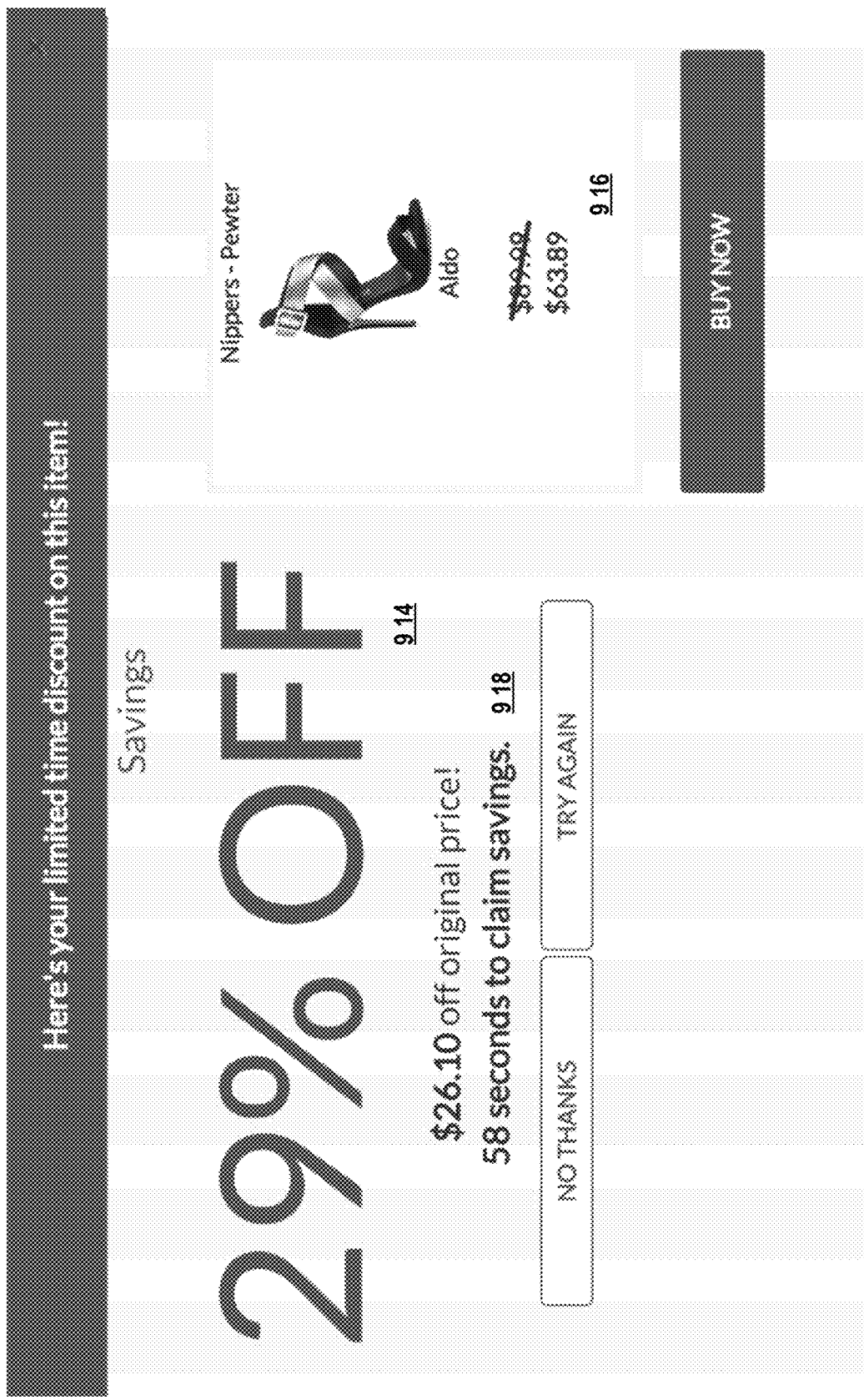

FIGS. 8A-9C are screenshot diagrams illustrating product discount tasks in a web browser. For example, FIGS. 8A-D illustrate a first embodiment, wherein a website customer performs a question-based product discount task, and FIGS. 9A-C illustrate a second embodiment, wherein the website customer performs a shape identification product discount task. In some implementations, the website customer can be presented with an option 804/904, e.g., on the product information interface 802/902 in the merchant website user interface 104, to perform a product discount task for a product discount. The website customer can then be presented with the discount user interface 108, where the product discount task 808/908 can be displayed for the website customer. The discount user interface 108 can also continue to display the product information 810/910, e.g., including an image of the product, a product name, a merchant for the product, and/or a product price.

As noted above, the product discount task can include watching and/or viewing an advertisement, reading text, completing a survey, and/or performing a number of other types of product discount tasks. In some implementations, product discount task 808 can involve watching a video to answer at least one question about the video, and product discount task 908 can involve watching a video to determine a shape 906a appearing within the video. Many other goals and/or actions can be inherent in the performance of the product discount task. For example, if the website customer is asked to sign up for an email list, the discount user interface 108 can determine, by sending queries to the discount management server 100, to confirm that the website customer submitted a valid and/or verified email address for the email list. During this period, the discount user interface 108 can also collect information about the website customer's completion of the product discount task (e.g., how long it takes the website customer to complete the entire product discount task, how long it takes the website customer to respond to the product discount question, and/or the like). The product discount interface 108 can also insert hidden fields (e.g., fields which are visible to computer entities but not to human entities) in the interface, and can determine whether the website customer provided any input and/or data to the hidden fields.

In some implementations, product discount tasks can vary and/or include additional content to adapt to differences between various OSes. For example, a device running an iOS operating system may need an alternative way to provide shapes 906a to a website customer, e.g., due to how iOS renders videos. For example, while the discount user interface 108 may be able to overlay Flash-rendered shapes 906a on a video regardless of a device's orientation for some operating systems and/or devices, the discount user interface 108 may not be able to properly render the Flash-rendered shape 906a in iOS, e.g., if the website customer rotates the device, and if iOS replaces the discount user interface 108 with a native full-screen video interface. To allow the website customer to obtain similar information, the product discount task can also include closed-captioning data 906b, which can include a word (e.g., "Circle,") describing the shape, can include a shape, and/or can include other data the website customer can use to answer a product discount question 912. The product discount task can also include other alternative data to provide information to the user which may not be available to her when using a particular device, such as sound effects embedded in a product discount task video, an audio message indicating what shape should have displayed, HTML text for images which may not display on the website customer's device, and/or other such features.

The product discount tasks can also be chosen for the website customer based on the capabilities of the website customer's OS. For example, if the website customer is using a mobile device with a mobile OS, the discount management system can provide a product discount task to the website customer which may require less bandwidth and/or data to perform, and/or may provide a product discount task (e.g., such as a survey) designed for mobile layouts. Similarly, if the website customer is using a device with a desktop OS, the discount management system can provide product discount tasks that may require more processing speed and/or power, may involve more data, and/or product discount tasks which may benefit from use of a larger sceen.

In some implementations, the discount user interface can determine whether the website customer has an ad-blocking software installed that may interfere with the product discount task, whether the website customer has the product discount task in view, whether the website customer has her client device muted and/or does not have headphones connected to her client device, whether the website customer is actually viewing the product discount task (e.g., by utilizing a front-facing camera on the website customer's device (such as camera 1022 in FIG. 10) to track the website customer's eye movement), and/or whether any other conditions exist which may indicate that the website customer cannot and/or will not properly perform the product discount task. Within the discount user interface 108, the website customer can be informed of such problems, e.g., via messages on the screen, via push notifications from the mobile application, via auditory alerts to the website customer, and/or through other means. In some implementations the product discount task can be paused and/or cancelled until such problems are fixed by the website customer. For example, if a video product discount task does not load within the website customer's client device 102a-c, the client device 102a-c can send a message to the discount management server 100 indicating that the product discount task could not be loaded properly. The discount management server 100 can send solution suggestions to the discount user interface 108 for the discount user interface 108 to display the solution to the website customer, e.g., such as the website customer may have ad-blocking software running, the website customer may not have a required plugin and/or software installed to complete the product discount task, and/or the like The discount user interface 108 can then present, e.g., after a predetermined amount of time, a product discount task question 812/912 to the website customer. In some implementations, product discount task question 812 can ask a multiple-choice question about the content of the video, and product discount task question 912 can ask which shape shape 906 appeared within the video. If the website customer answers the question correctly, the discount user interface 108 can present a discount value 814/914 to the website customer, e.g., based on the user's performance of the product discount task, and/or based on other factors described in FIGS. 3A-6B described above. The discount user interface 108 can also display a discounted price 816/916 for the product, and/or a time limit 818/918 for considering the product discount, e.g., before the product discount expires. The website customer can choose to accept the product discount (e.g., by purchasing the product at the discounted price), and/or can choose to reject the product discount. The website customer can have the option to obtain a new product discount.

Figure 10A:
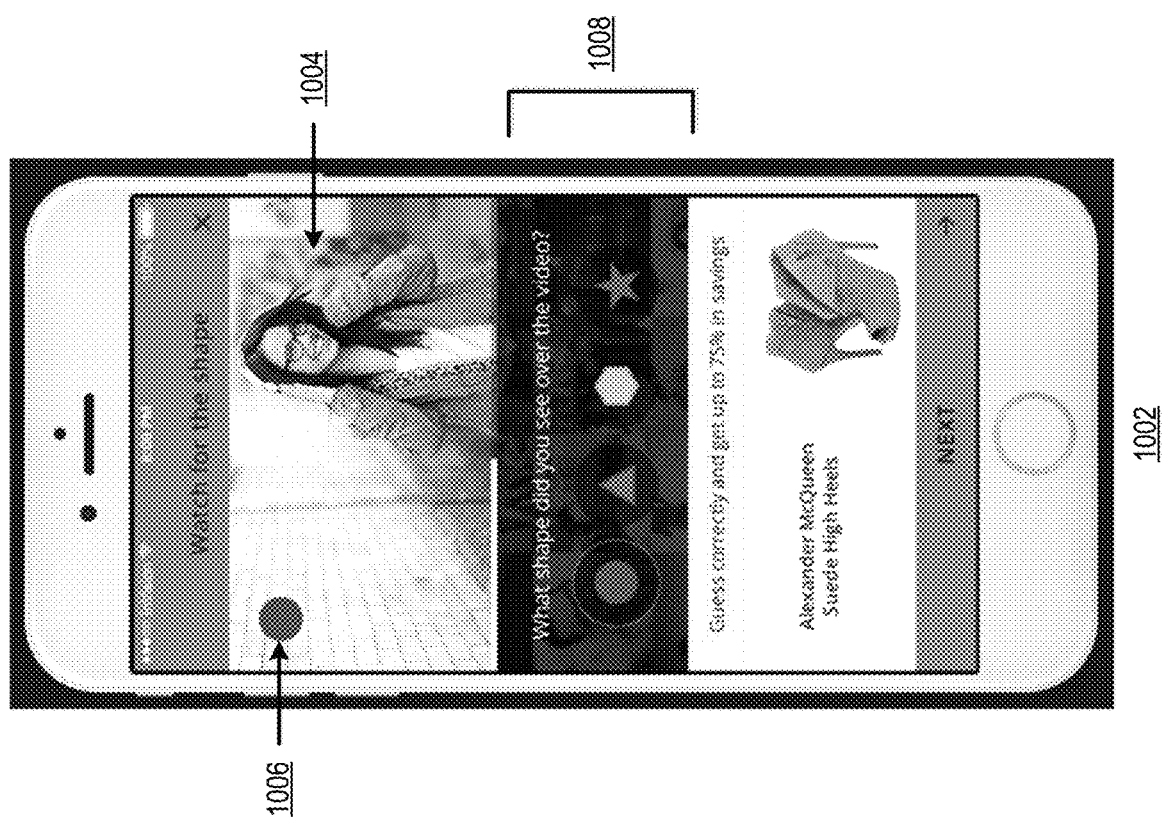
FIGS. 10A-C are screenshot diagrams illustrating shape identification product discount tasks in a mobile application, according to an embodiment.
Figure 10B:
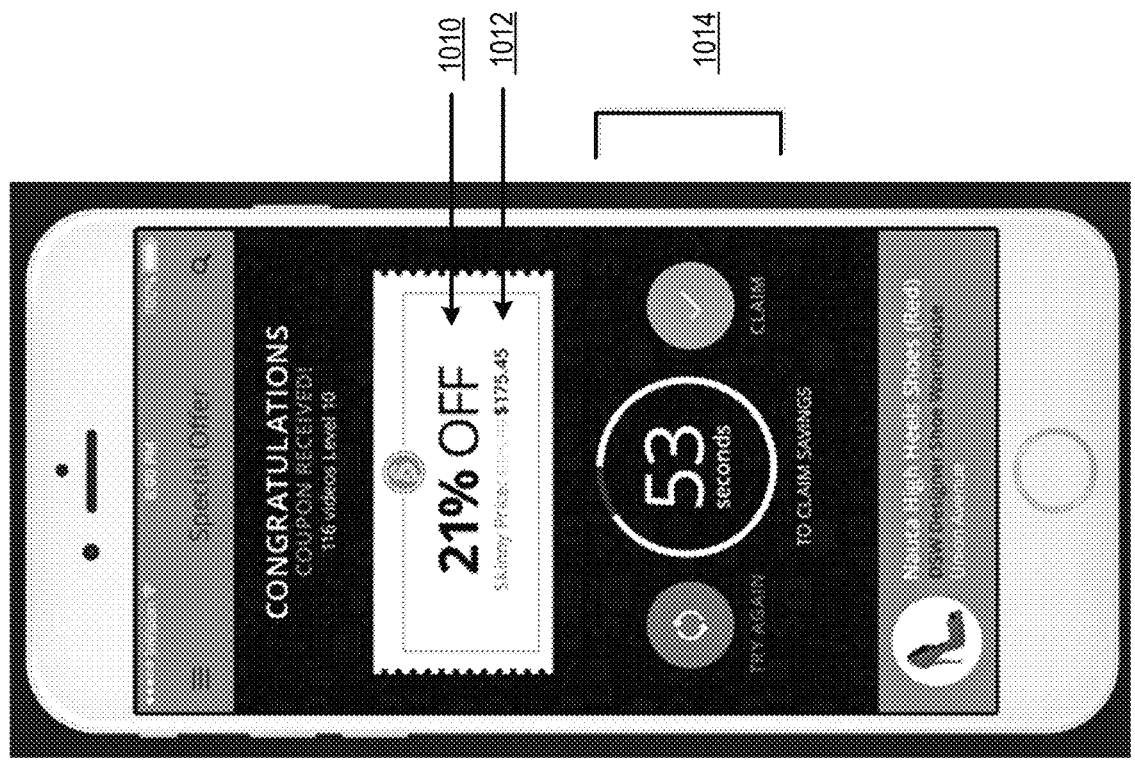
Figure 10C:
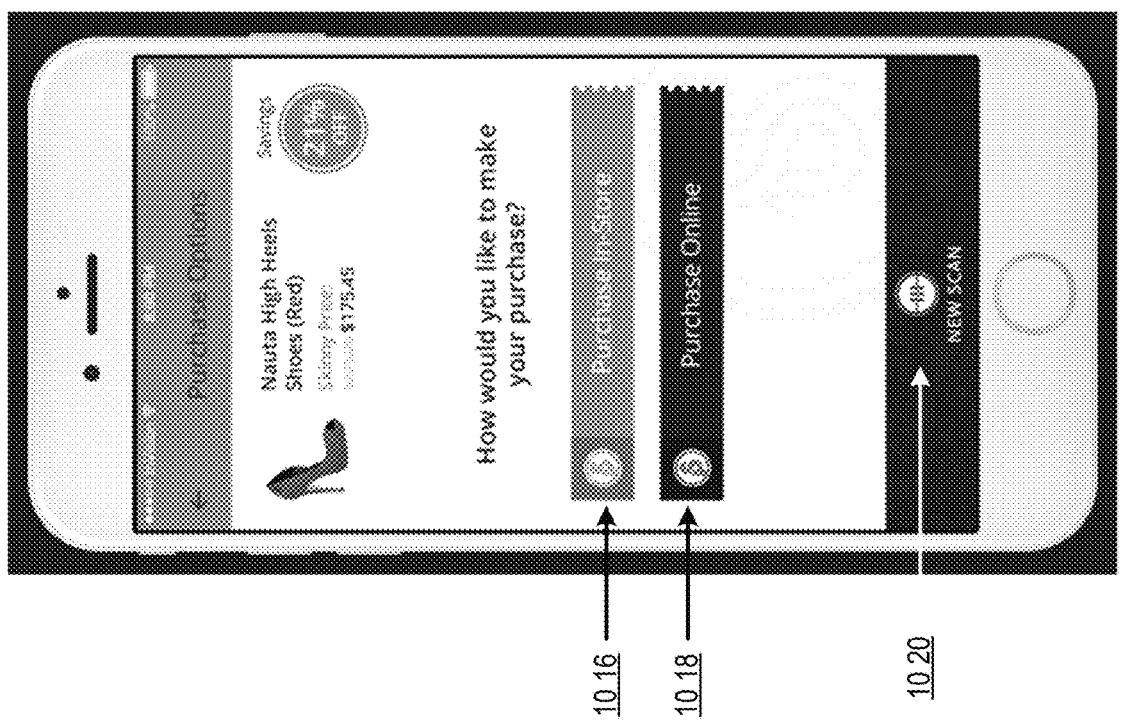

FIGS. 10A-C are screenshot diagrams illustrating shape identification product discount tasks in a mobile application. Similar to the interfaces described in FIGS. 8A-9C, the discount user interface 108 within a mobile application interface 1002 can display a product discount task 1004, e.g., where the product discount task overlays a shape 1006 within the product discount task, and where the website customer is asked to identify 1008 the shape the product discount task displays. The discount user interface 108 can, if the website customer answers correctly, display for the user her product discount 1010, the new discounted price of the product 1012, and/or a time limit 1014 for considering the product discount. In addition, using a mobile application on a mobile device, the website customer can, if the website customer scanned the product to obtain the product (e.g., see FIG. 7 for more details), can choose to purchase the product in-store 1016 using the product discount, can choose to purchase the product online 1018 using the product discount, and/or can choose to perform a scan on a new, and/or the same, product 1018.

Figure 11:
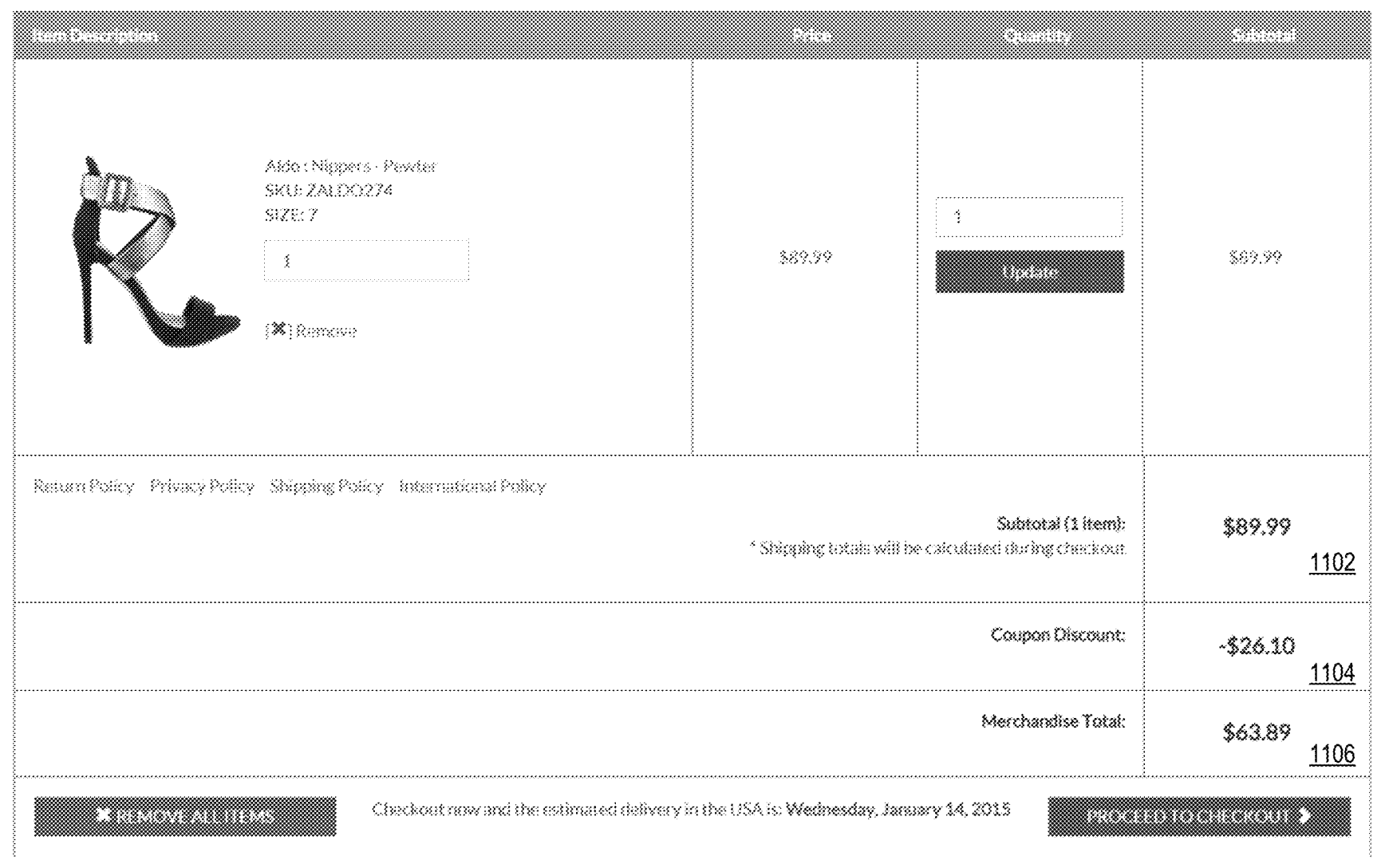

FIG. 11 is a screenshot diagram illustrating a merchant website shopping cart, e.g., after accepting a product discount in FIGS. 8A-9C. For example, in some implementations, the merchant website shopping cart can display normal shopping cart data, such as the product data, and the original product price 1102. After the website customer has obtained a product discount 1104, the product discount 1104 can be displayed in the shopping cart, e.g., as altering the price of the product. The shopping cart can dynamically update the product price 1102 based on the value of the product discount 1104, and can display the updated price 1106 to the website customer.

Figure 12:
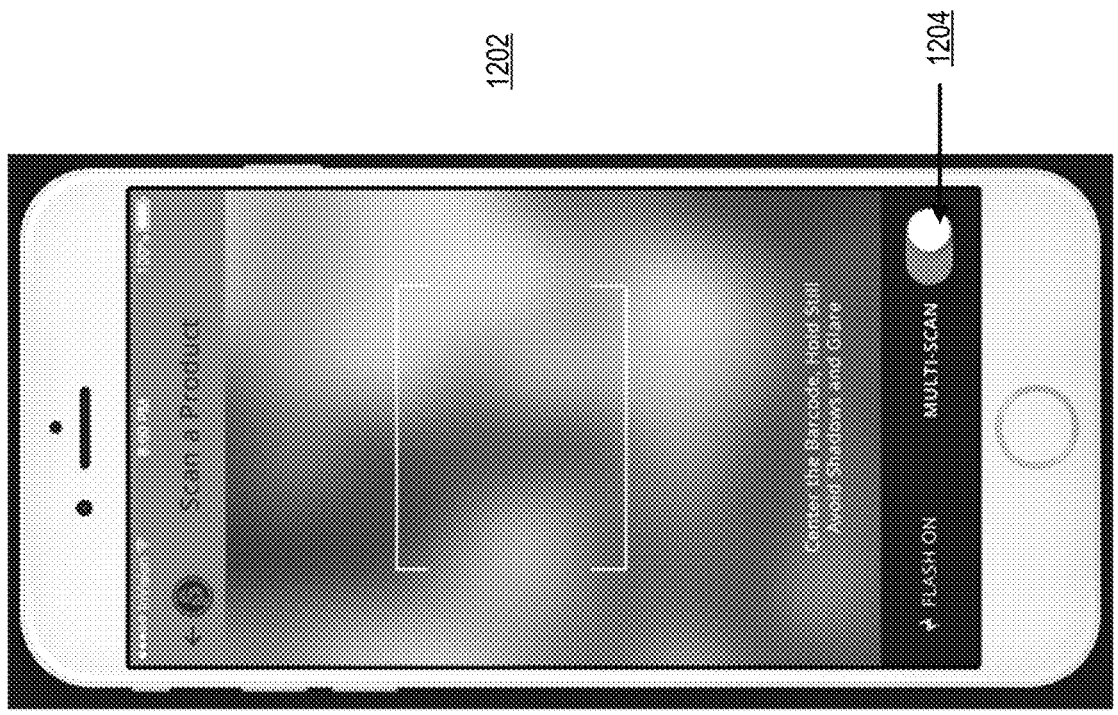
FIG. 12 is a screenshot diagram illustrating scanning a product using a mobile device, according to an embodiment.
Figure 13:
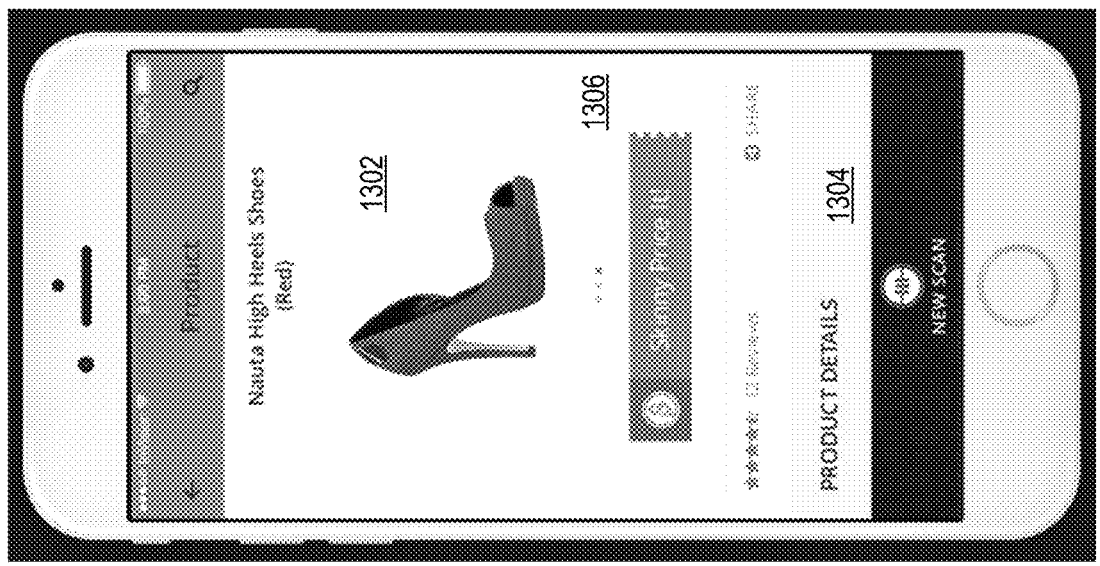
FIG. 13 is a screenshot diagram illustrating a scanned product, according to an embodiment.

FIGS. 12 and 13 show screenshot diagrams illustrating scanning a product. For example, in some implementations a website customer can use a client device (such as a mobile device) to scan a physical product at a physical store, and/or to capture data about a product found at a merchant website on another client device. The website customer can use a scanning interface 1202, e.g., similar to a mobile phone camera and/or QR code scanner, to capture data about the product, such as data from a barcode, QR scanner, and/or a picture of the product. The website customer can also specify 1204 whether she is attempting to capture one product, and/or multiple products. Referring to FIG. 13, once the mobile device has captured the product data, and has identified the product (e.g., see FIG. 7 for more details), the mobile device can, via a merchant website user interface 104, display product information 1302 such as the product name and/or a product image, and/or can allow the website customer to view more details 1304 about the product (such as where it is sold, a product price, and/or other related product information). The website customer can also be provided with an option to obtain a discount 1306 on the product.

CONCLUSION

While various embodiments have been described and illustrated herein, a variety of other means and/or structures for performing the function and/or obtaining the results and/or one or more of the advantages described herein, and each of such variations and/or modifications is deemed to be within the scope of the disclosure. More generally, all parameters, dimensions, materials, and configurations described herein are meant to be examples and that the actual parameters, dimensions, materials, and/or configurations will depend upon the specific application or applications. It is, therefore, to be understood that the foregoing embodiments are presented by way of example only.

The above-described embodiments can be implemented in any of numerous ways. For example, embodiments of designing and making the mobile configuration files and mobile application layouts disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the mobile configuration files and mobile application layouts disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the disclosure discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods described herein need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various aspects of the description discussed herein may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of automatically determining and providing a discounted price for a product displayed on a merchant website for a website customer browsing the merchant website using a network-enabled device in response to automatic verification that the website customer has successfully completed a device-specific task, the method comprising:
   (A) obtaining, via a user interface provided on the merchant website and the internet-enabled device, a request from the website customer to obtain a discount on the product displayed on the merchant website;
   (B) retrieving an indication of browsing activity of the website customer on the internet-enabled device;
   (C) determining an operating system (OS) of the internet-enabled device based at least in part on the request obtained in (A);
   (D) estimating a geographic location of the website customer based on at least one of a Global Positioning System (GPS) signal from the internet-enabled device and an Internet Protocol (IP) address of the internet-enabled device;
   (E) automatically determining, based at least in part on the product displayed on the merchant website, the indication of browsing activity of the website customer retrieved in (B), and the geographic location estimated of the website customer in (D), a product discount function representative of a plurality of product discounts on the product displayed on the merchant website;
   (F) retrieving, from a memory, a product discount task for the website customer based at least in part on the OS of the internet-enabled device determined in (B);
   (G) sending the product discount task retrieved in (F) to the internet-enabled device for display to the website customer;
   (H) obtaining, via the user interface and the internet-enabled device, an indication of whether or not the website customer successfully completed the product discount task; and
   (I) if the indication obtained in (H) indicates that the website customer has successfully completed the product discount task, automatically selecting the discounted price based on the product discount function determined automatically in (D).

2. The method of claim 1, wherein (A) further comprises: automatically retrieving, from a database via an application programming interface, product information associated with the product displayed on the merchant website.

3. The method of claim 1, wherein:
   (A) further comprises automatically retrieving, from a database via an application programming interface, information associated with the website customer, and
   (E) further comprises automatically determining, based at least in part on the information associated with the website customer, the product discount function.

4. The method of claim 1, wherein (D) further comprises: pinging the IP address of the internet-enabled device.

5. The method of claim 1, wherein (E) further comprises: determining the product discount function based at least in part on at least one of input from the website merchant and the product discount task retrieved in (F).

6. The method of claim 1, wherein (F) further comprises:
retrieving, from the memory, the product discount task for the website customer based at least in part on the product displayed on the merchant website, the indication of browsing activity of the website customer retrieved in (B), and the geographic location estimated of the website customer in (D).

7. The method of claim 1, wherein (F) further comprises:
(F1) for a first type of the OS of the internet-enabled device, providing a close-captioned verification code with the product discount task; and
(F2) for a second type of the OS of the internet-enabled device, providing a flash overlay verification code with the product discount task.

8. The method of claim 1, wherein the product discount task comprises watching an advertisement for a period greater than an advertisement impression period, and wherein (H) further comprises:
determining if the website customer watched the advertisement for a period greater than the advertisement impression period.

9. The method of claim 8, wherein (E) further comprises:
determining the product discount function based at least in part on whether or not the website customer watched the advertisement for a period greater than the advertisement impression period.

10. The method of claim 1, wherein (H) further comprises:
(I1) recording an indication of whether or not the website customer purchased the product at the discounted price; and
(I2) automatically adjusting the product discount function in response to the indication of whether or not the website customer purchased the product at the discounted price.

11. The method of claim 1, wherein (I) further comprises:
automatically selecting the discounted price based at least in part on whether another website customer has successfully completed another product discount task.

12. A computer system for automatically determining and providing a discounted price for a product displayed on a merchant website for a website customer browsing the merchant website using a network-enabled device in response to automatic verification that the website customer has successfully completed a device-specific task, the computer system comprising:
a network interface operably coupleable to the internet;
a memory to store a plurality of product discount tasks and a plurality of product discount functions, each product discount function in the plurality of product discount functions representative of a respective plurality of product discounts on the product displayed on the merchant website; and
a processor, operably coupled to the network interface and to the memory, to:
(A) obtain, via the network interface, a request from the website customer to obtain a discount on the product displayed on the merchant website;
(B) retrieve, via the network interface, an indication of browsing activity of the website customer on the internet-enabled device;
(C) determine an operating system (OS) of the internet-enabled device based at least in part on the request from the website customer;
(D) estimate a geographic location of the website customer based on at least one of a Global Positioning System (GPS) signal from the internet-enabled device and an Internet Protocol (IP) address of the internet-enabled device;
(E) automatically select, based at least in part on the product displayed on the merchant website, the indication of browsing activity of the website customer, and the geographic location of the website customer, one of the plurality of product discount functions stored in the memory;
(F) retrieve, from the memory, a product discount task for the website customer based at least in part on the OS of the internet-enabled device;
(G) send, via the network interface, the product discount task to the internet-enabled device for display to the website customer;
(H) obtain, via the network interface, an indication of whether or not the website customer successfully completed the product discount task; and
(I) if the indication indicates that the website customer has successfully completed the product discount task, automatically select the discounted price based on the one of the plurality of product discount functions.

13. The computer system of claim 12, wherein the processor is configured to automatically retrieve, via an application programming interface, product information associated with the product displayed on the merchant website.

14. The computer system of claim 12, wherein the processor is configured to:
automatically retrieve, from a database via an application programming interface, information associated with the website customer, and
automatically select, based at least in part on the information associated with the website customer, the one of the plurality of product discount functions.

15. The computer system of claim 12, wherein the processor is configured to estimate the geographic location of the website customer at least in part by pinging the IP address of the internet-enabled device.

16. The computer system of claim 12, wherein the processor is configured to automatically select the one of the plurality of product discount functions based at least in part on at least one of input from the website merchant and the product discount task.

17. The computer system of claim 12, wherein the processor is configured to automatically retrieve the product discount task for the website customer based at least in part on the product displayed on the merchant website, the indication of browsing activity of the website customer, and the geographic location of the website customer.

18. The computer system of claim 12, wherein the processor is configured to:
provide a close-captioned verification code with the product discount task for a first type of the OS of the internet-enabled device; and
provide a flash overlay verification code with the product discount task for a second type of the OS of the internet-enabled device.

19. The computer system of claim 12, wherein the product discount task comprises watching an advertisement for a period greater than an advertisement impression period, and wherein the processor is configured to:
determine if the website customer watched the advertisement for a period greater than the advertisement impression period.

20. The computer system of claim 19, wherein the processor is further configured to automatically select the one of the plurality of product discount functions based at least in part on whether or not the website customer watched the advertisement for a period greater than the advertisement impression period.

21. The computer system of claim 12, wherein the processor is configured to:
   record, in the memory, an indication of whether or not the website customer purchased the product at the discounted price; and
   automatically adjust the one of the plurality of product discount functions in response to the indication of whether or not the website customer purchased the product at the discounted price.

22. The computer system of claim 12, wherein the processor is configured to automatically select the discounted price based at least in part on whether another website customer has successfully completed another product discount task.

* * * * *